(12) United States Patent
Ross et al.

(10) Patent No.: US 7,716,634 B2
(45) Date of Patent: May 11, 2010

(54) SYSTEM AND METHOD FOR BUILDING AND MODIFYING SOFTWARE APPLICATIONS

(75) Inventors: David Ross, Lake Arrowhead, CA (US); Ronald R. Gans, Santa Barbara, CA (US)

(73) Assignee: Medseek Inc., Solvang, CA (US)

( * ) Notice: Subject to any disclaimer, the term of this patent is extended or adjusted under 35 U.S.C. 154(b) by 1083 days.

(21) Appl. No.: 11/334,834

(22) Filed: Jan. 19, 2006

(65) Prior Publication Data

US 2007/0234274 A1     Oct. 4, 2007

(51) Int. Cl.
*G06F 9/44* (2006.01)
*G06F 9/45* (2006.01)

(52) U.S. Cl. .................... 717/106; 717/109
(58) Field of Classification Search .......... 717/104–116
See application file for complete search history.

(56) References Cited

U.S. PATENT DOCUMENTS

| | | | | |
|---|---|---|---|---|
| 6,550,057 | B1 * | 4/2003 | Bowman-Amuah | 717/126 |
| 6,714,219 | B2 * | 3/2004 | Lindhorst et al. | 715/769 |
| 6,845,503 | B1 * | 1/2005 | Carlson et al. | 717/166 |
| 7,020,869 | B2 * | 3/2006 | Abrari et al. | 717/108 |
| 7,188,333 | B1 * | 3/2007 | LaMotta et al. | 717/106 |
| 7,266,806 | B2 * | 9/2007 | Choi et al. | 717/108 |
| 7,272,820 | B2 * | 9/2007 | Klianev | 717/109 |
| 7,275,096 | B2 * | 9/2007 | Green | 709/223 |
| 7,284,233 | B2 * | 10/2007 | Sengodan | 717/102 |
| 7,349,913 | B2 * | 3/2008 | Clark et al. | 707/101 |
| 7,376,933 | B2 * | 5/2008 | Gerken et al. | 717/106 |
| 7,404,177 | B1 * | 7/2008 | Greenfield et al. | 717/106 |
| 7,437,707 | B2 * | 10/2008 | Huerta et al. | 717/104 |
| 7,512,932 | B2 * | 3/2009 | Davidov et al. | 717/106 |
| 7,543,267 | B2 * | 6/2009 | Lindhorst et al. | 717/105 |
| 7,546,576 | B2 * | 6/2009 | Egli | 717/106 |
| 7,565,640 | B2 * | 7/2009 | Shukla et al. | 717/105 |
| 7,581,206 | B2 * | 8/2009 | Saad et al. | 717/106 |
| 7,617,480 | B2 * | 11/2009 | Falter et al. | 717/106 |
| 7,644,390 | B2 * | 1/2010 | Khodabandehloo et al. | 717/105 |

OTHER PUBLICATIONS

Rossi et al, "Model based design of volatile functionality in web applications", IEEE LA WEB, pp. 1-10, 2006.*
Reif et al, "WEESA—Web engineering for semantic web applications", ACM WWW, pp. 722-729, 2005.*
Fiala et al, "Design and implemenation of componenet based adaptive web presentataions", ACM SAC, pp. 1698-1704, 2004.*
Hao et al, "Usage based statistical testing of web applications", ACM ICWE, pp. 17-24, 2006.*

* cited by examiner

*Primary Examiner*—Anil Khatri
(74) *Attorney, Agent, or Firm*—Fliesler Meyer LLP

(57) ABSTRACT

A system for creating applications, such as web applications, allows a non-technical trained user to build and edit applications. The tool used to build the applications creates the application elements including actions, screens, data, header and footer, and scripts, which are stored and accessed as records in a database. The web application that is created can be exported to and installed within a website.

9 Claims, 16 Drawing Sheets

```
<span class=instructions>#instructionlist[position]#<BR><BR></span>
<div style="position:relative;top:15;left:20;">
<table class=wizform>
    <tr>
        <th class=wizform > Enter a name for the module </th>
        <td class=wizform >
        <input type="text" name="wzmodulename" value="" style="width:180;"></td>
    </tr>
    <tr>
        <th class=wizform >Description of the module </th>
        <td class=wizform><textarea cols="12" rows="3"
name="wzmoduledescription">#wzmoduledescription#</textarea></td>
    </tr>
    <tr title="Your name">
        <th class=wizform>Authors name</th>
        <td class=wizform><input type="text" name="wzmoduleauthor"
value="#wzmoduleauthor#" style="width:180;"></td>
    </tr>
</table>
</div>
```

| | |
|---|---|
| Block of screens: one or more screen definitions. These are used to build the sequence of wizard screens. A template will typically have a dozen or more screens. | ```<?xml version="1.0"?><br><moddata><br><data><br><wizardname>Contact Us</wizardname><br><screendata><br><screen>``` |
| Name of the screen<br>Name of the *form* script to call<br>Screen instructions (appears in the screen) | ```<screenname>General Settings</screenname><br><formname>generalsettings.cfm</formname><br><instructions>This application allows users...</instr<br></screen><br></screendata>``` |
| Variable block: define and initialize any variables that will be used by the build process or application.. | ```<variables><br><variable><br><varname>wzmodulename</varname><br><defaultvalue>Contact Us</defaultvalue><br></variable><br></variables>``` |
| Field data block: Define and describe fields that are used in the application forms or database. Properties include fieldname, label, required, width, type, and datatype. These definitions are used to "preload" the wizard with appropriate values and save the user some work. | ```<fielddata><br><field><br><fieldname>recipient</fieldname><br><LBL>Recipient</LBL><br><REQ>yes</REQ><br><WIDTH>3</WIDTH><br><TYPE>scrolling menu</TYPE><br></field><br></fielddata><br></data><br></moddata>``` |
| codeWriters: Every template includes calls to load codeWriters. codeWriters accept the configuration information collected by the wizard screens, and do the work of actually generating the application code blocks. codeWriters may call other codeWriters. Most applications require a dozen or more codeWriters | ```<cfinclude template="codewriters/sm6api/wri_wz_buildform.c<br><cfinclude template="codewriters/sm6api/wri_wz_buildadmin.<br><cfinclude<br>template="codewriters/sm6api/wri_wz_builddatahandler.cfm">``` |

FIGURE 7A

SYSTEM AND METHOD FOR BUILDING AND MODIFYING SOFTWARE APPLICATIONS

FIELD OF THE INVENTION

The present invention relates generally to systems and methods for building software applications, and more particularly, to software development tools for building applications, such as web applications.

BACKGROUND OF THE INVENTION

As recently as a few years ago, websites consisted primarily of a collection of web pages, stored in static .htm files, designed to be viewed by visitors to the website. When a website visitor wanted to see a web page, the visitor would click a link and a web server would simply return the .htm file to a computer's web browser which would then file the content as formatted by <HTML> tags. There was little or no interaction possible with those web pages, and the content on those web pages generally could be altered only by directly editing the .htm file on the web server.

Today, nearly all websites contain content that rarely is contained within simple static .htm files. Much of this content is stored within and extracted from databases, Extended Markup Language (XML) files and other data repositories. When that content is seen on a web page, something has acted to retrieve that content and place it on the web page. In addition, website visitors now can often interact with web pages, doing such things as online shopping, filling out forms, or searching for information. Web pages that contain this kind of content or interaction are called dynamic web pages. The backend systems that access the data repositories and enable this dynamic content and user interactivity are called web applications.

Web applications historically have been very complex, expensive and time consuming to build, often requiring the services of large groups of experienced software programming engineers and software applications designers. These web applications basically include "screens'" and "action scripts". Screens are what the website visitor sees in his web browser window, and can consist of static text, forms for collecting information, navigator buttons, graphics and content retrieved from a data repository. Action scripts, sometimes called "business logic", perform the backend job of managing the content stored within the data repositories used by the web application. And, the data repositories themselves can be located on the web server providing the web page, within separate database servers, or even within other websites.

A data repository is, therefore, not part of the web application. Rather, the web application may create a data repository, manage its content, and even delete a data repository. The content and data repository, being separate and independent of the web application, thereby enables the content to be shared by multiple web applications.

The need for web applications has grown exponentially as people have learned the value that such applications can bring to their businesses. This growing need for web applications, combined with the complexity and expense of developing these applications, indicates that it is desirable to have software development tools that can help produce web applications using reduced development time, cost, and complexity of the development process.

At the current time, there are a number of separate and individual software tools that can be used to build the various components that make up a web application. A disadvantage to the known systems is that none contain all of the tools necessary to create complete applications, and none of the known systems allow for a desirable degree of integration of all such tools, and all required the participation of technically trained software programmers.

The prior art does not allow non-technical users to build the kind of complex web applications found in most websites today. Furthermore, no known prior art allows the non-technical user to modify these web applications once they have been deployed into websites. The several known individual software applications or tools that are available perform limited tasks for enabling the development of web applications. Furthermore, while the disparate tools that are available to develop web applications are user friendly, they are so primarily only to those users who are experienced, technically trained software programmers.

SUMMARY OF THE INVENTION

It is an object of the present invention to provide a system and a method that assist non-technical users to build and modify applications.

Some embodiments of the present invention include a software system for enabling a user to build applications that includes a user interactive interface being presentable on a computer display screen, which is common to the individual software tools for enabling such access. The system is installable on a web server and executable from within a web browser of a local computer.

Some embodiments of the present invention use templates that indicate a sequence of screens for obtaining parameters. The templates can point to code writers to produce blocks of code for constructing a web application.

BRIEF DESCRIPTION OF THE DRAWINGS

FIG. 5 shows the structure of a typical "form" component script of one embodiment.

FIG. 6 shows the structure of a typical "writer" component script of one embodiment.

FIG. 7A shows elements of a template file of one embodiment.

DETAILED DESCRIPTION OF THE DRAWINGS

Figure 1:
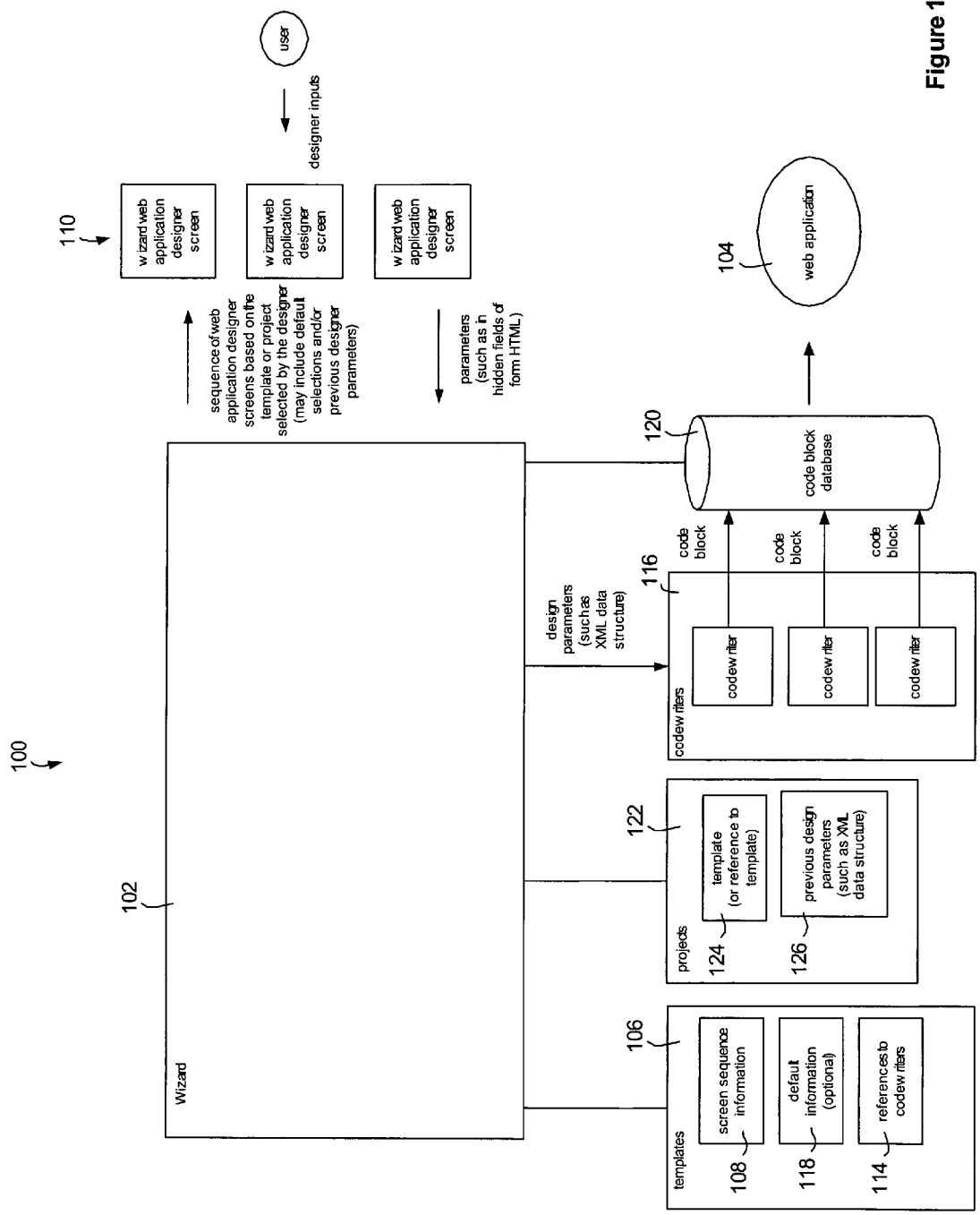
FIG. 1 illustrates a system of one embodiment of the present invention.

As the figures show and descriptions in other sections show, this invention has been reduced to practice in more than one embodiment. This section summarizes one of those embodiments.

One embodiment of the present invention is the software application entitled "Studio Wizard". This embodiment is a web application written in the Macromedia Cold Fusion scripting language.

Studio Wizard can contain a set of "wizard templates" and associated "code writers". Each wizard template can collect the information necessary from the user to build an application belonging to a family of potential applications. This information can be stored into a "project." The associated code writer can then be used to construct the application itself from the "project." Studio Wizard may then install the application on to a web site by connecting to an outside application which places the module onto a web site. The application may be reviewed and tested in a staging area and/or published onto a live site.

Studio Wizard can contain an interface layer for connecting to outside applications. Studio Wizard may run independently of other applications, or it may connect to an outside application. If connected to an outside application, that application may be used for any or all of the following: user authentication and authorization, module installation and execution, and project information storage and retrieval.

A wizard template can consist of a series of screens that collect information. Each screen can typically collect one type of information, such as "List Page Options", with more detailed choices being selectable from additional "pop-up" windows from each screen. The application creator can typically follow the screens in sequence when creating an application, but may revisit them out of sequence when editing an application.

The order and properties of wizard template screens can be stored in an XML file. This file can reference custom script routines to execute for precise control of screen layout and functionality. Studio Wizard itself can manage all the data persistence from screen to screen and form processing to simplify the development of wizard templates.

One Studio Wizard template can be "eLibrary". This family of applications can collect information from an administrator and presents the information to web site visitors. The administrator can create new data records, search, review, edit, and delete existing data records, or manage supporting information, such as lookup tables or images. Web site visitors may search for data, review lists of data records, and display detailed record information. They may also display a printer-friendly version of the data or email the data to a friend.

The creator of an eLibrary-family application can choose the names of the data fields to be stored, the database types of the fields, the ordering of the fields, and the format the fields may be displayed in. The creator can select if the module administrator will see a search screen and what fields appear on it, and what fields and features appear on the listing screen. The creator can also select if the web site visitor will see a search screen and what fields appear on it, what fields and features will be on a listing screen, and if there will be a detail screen and what fields appear on it. The creator may also select from a number of other options, including but not limited to, whether the email a friend feature is included, whether a printer-friendly version of the data will be made available, if the application uses workflow approval, and if the application data appears in a web site side-wide search.

One Studio Wizard template can be "eForms". This family of applications can collect information from web site visitors that can be reviewed by administrators. The web site visitor may complete a form and see a response screen. The administrator may create new form records or review, edit, and delete form records, or manage supporting information, such as lookup tables. The administrator may also maintain a list of form destinations from which the user may select when they complete the form. Emails can be sent by the application when forms are completed to the user completing the form and the administrator who is reviewing the form.

The creator of an eForm-family application can choose the names of the data fields to be stored, the database types of the fields, the ordering of the fields, and the format the fields may be displayed in. The creator can select what functionality the administrator will have, such as whether or not an administrator may edit or delete form data, and whether or not a list of contacts should be maintained versus using a single contact for the form. The creator can also determine what emails will be sent by the application and the content of those emails, including text messages or data from the completed form. The creator can also create the messages to be displayed to the web site visitor on the form page and after the form has been submitted.

The Studio Wizard code writers can be divided into three tiers. Tier 1 is the application level. Tier 2 is the method level. Tier 3 is the command level. This object-oriented, component design allows for maximum flexibility as well as supporting maximum code reuse.

The Tier 1 code writers can usually handle one family of applications, although that is not an imposed restriction. This tier can use project information to determine which major components and methods to include within the application and how to configure those components. Tier 1 code writers can call the appropriate code writers in Tier 2 in order to build the needed methods. Tier 1 can then combine these methods together into an application.

The Tier 2 code writers can each create a single application method, which typically corresponds to a single user screen or functional action. These code writers can have access to the project information and can use the project information plus configuration options transmitted by Tier 1 code writers to produce the needed method functionality. Tier 2 code writers can call the appropriate code writers in Tier 3 to create the actual source code. Tier 2 can then combine the source code blocks together to product a method.

The Tier 3 code writers can create actual source code. Each code writer can typically create a piece of code that handles a very specific but generic task. These code blocks are often only one or a few lines long, but they may be as long as necessary. Each Tier 3 code writer can accept a fixed list of parameters and does not have access to the project information. This makes each code writer very well defined as well as being simple to create.

In one embodiment, since all actual source code is created by Tier 3, Studio Wizard may produce applications in alternate languages by replacing only the Tier 3 code writer layer. Since this layer is well-defined and simple to create, this provides a very flexible framework for application development across multiple languages.

Studio Wizard projects are XML documents, which may be stored on a file system or within a database. These documents store all the information necessary to construct the application. This information includes, but is not limited to, general application information, database and field configuration information, screen information, and application options.

FIG. 1 illustrates a wizard system of one embodiment. In this example, the wizard 102 is used for producing an application 104, such as a web application. The wizard 102 can be any type of software used to produce an application. The wizard can make it easier for novices to construct an application. The wizard 102 can be associated with templates 106. Templates 106 can be any element that implements the template functions. Template 106 can include screen sequence information 108, which can be used by the wizard 102 to produce a sequence of screens 110. The sequence of screens 110 can be used by the designer to input information concerning the desired application 104. In one embodiment, the screens include Hyper Text Markup Language (HTML) forms. The template 106 can also include references 114 to codewriters 116. The codewriters can be any element that allows for the construction of code blocks. Separating the templates 106 and the codewriters 116, simplifies codewriter updates and maintenance. The same codewriters can be referenced by multiple templates.

Default information 118 in the template 106 can be used to populate the sequence of screens 110 provided to a designer. The designer can provide input through the sequence of web screens 110 and this information can be passed back to the wizard 102 such as in hidden fields of HTML pages. The wizard 102 can pass these design parameters to the codewriters 116 indicated by the template 106, such as within an XML data structure. The codewriter 116 can then produce code blocks. The code blocks can be stored in the code block database 120 and can be combined together to produce the web application 104.

Data for the application 104 can be stored as a project 122. Project 122 can include a template or reference to a template 124 as well as the previous design parameters 126. The previous design parameters 126 can be stored in an XML data structure. When the user clicks on a project, the wizard 102 can use the previous design parameters 126 to populate displayed selections in the sequence of web designer screens 110. The users can then update these parameters and the modified parameters can be stored along with the project 122.

In one embodiment, the codewriters 116 can call other codewriters. The template 106 can include references to "form" codewriters which can be used to create the sequence of screens 110. The parameters can be stored as part of the project 122 and the parameters can be displayed at the sequence of screens 110 when the project is opened.

One embodiment of the present invention is a system to produce applications 104, comprising at least one codewriter 116 to use parameters to construct code blocks for the web application 104; a template 106 including screen definitions 108 for a sequence of screens 110 to obtain parameters for the codewriters and references 118 to multiple codewriters; and a wizard 102 to use the template 106 to construct the sequence of screens 110 to obtain the parameters for the at least one codewriter 116, to use the template 108 to indicate the at least one codewriter 116, and to provide the parameters to the at least one codewriter 116 to construct the code blocks for the web application 104.

The template 106 can include defaults 118 for the web application 104, at least some of the defaults 118 being displayed to and modifiable by a designer in one of the screens 110. The parameters can be passed to the codewriters in an XML data structure.

The wizard can combine the code blocks into the web application 104. The codewriters 116 can call other codewriters.

The template 106 can include references to form codewriters to produce the sequence of screens.

The parameters can be stored as part of a project 122. The parameters can be displayed in the sequence of screens 110 when the project is opened.

One embodiment of the present invention is a method of producing a web application comprising: constructing a sequence of screens 110 defined by a template to obtain parameters, the template 106 including screen definitions 108 for the sequence of screens 110 and references to at least one codewriter 116, providing the parameters to the at least one codewriter 116 indicated by the template 106; and using the at least one codewriter 116 to construct code blocks for the application 104.

An embodiment of the present invention includes at least one unit, such as codewriter 116, to use parameters to construct code blocks for the web application; a file, such as a template 105 including screen definitions for a sequence of screens 110 to obtain parameters for the units and a reference to the at least one unit; and a component, such as a wizard 102, to use the file to construct the sequence of screens to obtain the parameters for the multiple units, to use the file to indicate the multiple units, and to provide the parameters to the units to construct the code blocks for the web application.

Another embodiment of the present invention is a system 100 including at least one codewriter 116 to use parameters to produce code blocks for a web application 104; and a wizard to produce a sequence of screens 110 to obtain parameters from users and to provide the parameters to the at least one codewriter 116.

Yet another embodiment of the present invention is a method comprising providing a sequence of screens 110 to a user; receiving parameters from the user; providing the parameters to at least one codewriter 116 to produce code blocks; and combining the code blocks to produce a web application 104.

In one embodiment, the web application is a healthcare web application. The healthcare web application can include a Physician Portal. The Physician Portal can provide a single, personalized point of access to disparate information systems, content sources, and applications. In healthcare, enterprise physician portals can unify a highly fragmented information landscape. The Physician Portal can be used to improve care, reduce medical errors, strengthen the hospital-physician relationship, simplify workflow, improve access to information and current systems, enhance patient-physician interaction, and distribute data through a secure, auditable, HIPAA compliant environment.

The healthcare web application can include a Patient Portal. As with the empowerment of the consumer, the patient today is better informed, can shop and compare more easily and has greater expectations for communication because of the Internet. To meet the demands of the empowered patient, Patient Portals can allow patients such things as access to their physicians through secure messaging, the ability to view clinical data, specific relevant health information and care instructions, online appointment setting, pharmacy renewal, Personal Medical Records, bill look-up with payment option, Family Care Centers for securely sharing patient updates.

The healthcare web application can allow access to clinical data. Online access to clinical data through the healthcare web application can ensure security and authentication, data integrity, and compatibility with clinical workflow. The healthcare web application can provide schemas designed specifically for client's clinical data, discrete data elements that allow for customized searching and reporting, support for all electronic data types and formats, customized data views, interfaces for connection to legacy data sources, client-defined security and authentication to meet organization's standards, and audit trails.

The healthcare web application can allow access to health information. Such information can be channeled, personalized, e-mailed, searched, identified by taxonomy, labeled with custom tags and friendly URLs and edited and updated.

Figure 2A:
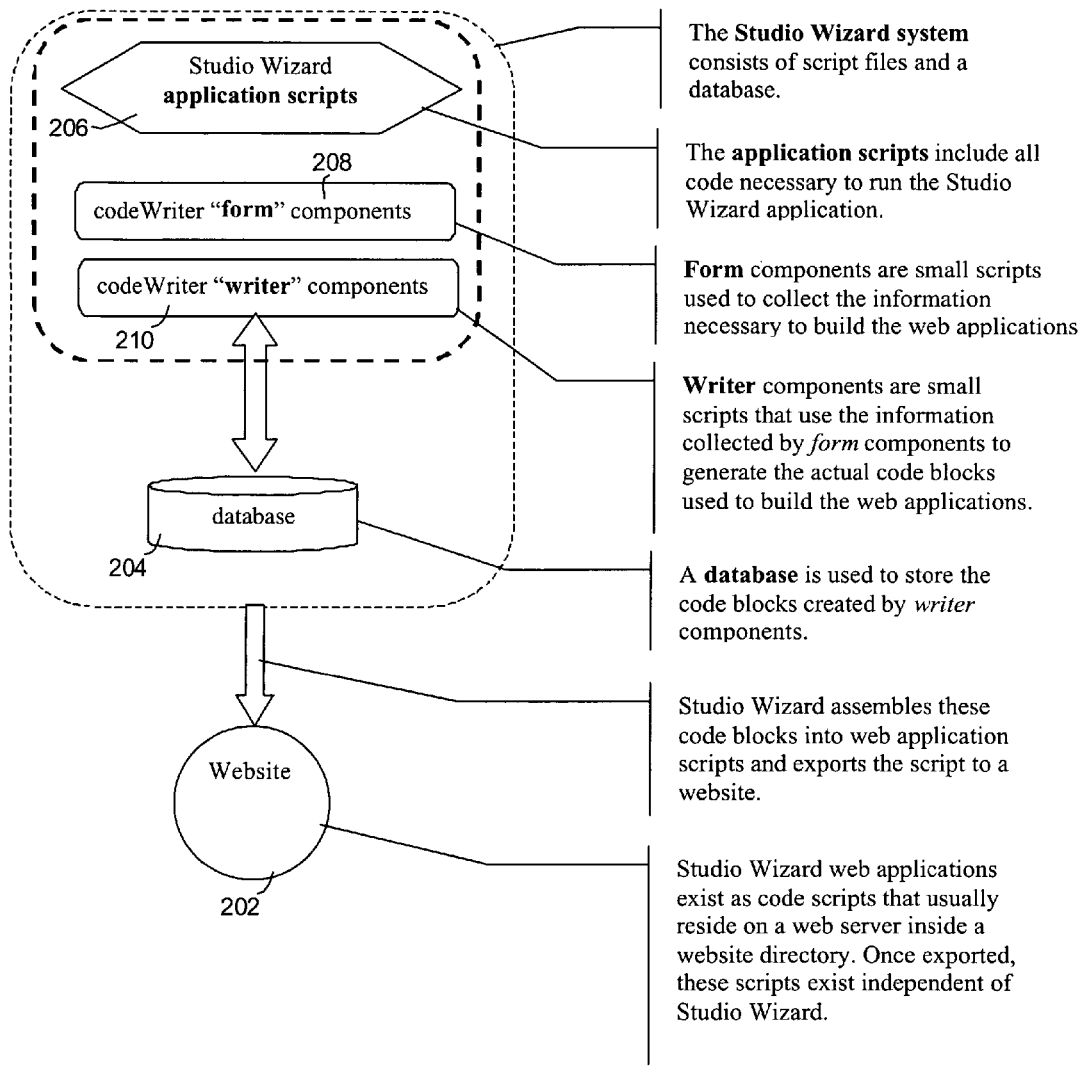
FIG. 2A illustrates a system software structure of one embodiment of the present invention.
Figure 2B:
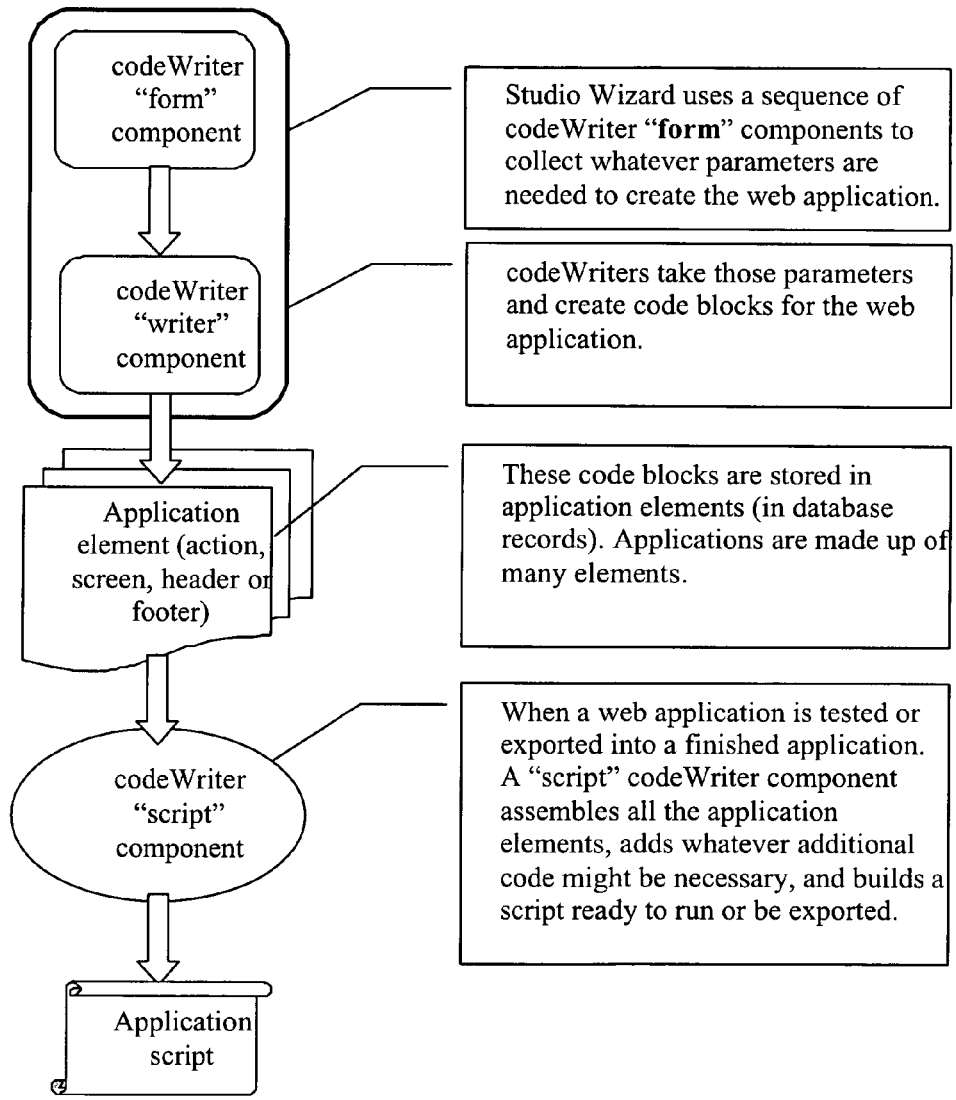
FIG. 2B illustrates the general process used to create applications of one embodiment.

FIGS. 2A and 2B illustrate one embodiment of a studio wizard system architecture. In this embodiment, the web application 202 is produced from code blocks stored in the database 204. Studio wizard and application scripts can be used as part of the wizard 206. Codewriters including "form" codewriters components 208 can be used to collect information to build a web application and codewriter "writer" components 210 which can be scripts to use information collected by the form components to generate the code blocks used the build the applications, such as web applications. These code blocks can be stored in the database 204. The wizard can assemble these code blocks into a web application scripts and export the script to a website.

A wizard can be an application designed to allow non-programmers to build and edit applications. To build a new web application, users can select a wizard template from a list of templates representing all kinds of different applications. The wizard template can contain configuration information (such as in the XML format) that tells the wizard what parameters must be collected from the user in order to build the web application, and can provide an ordered sequence of screens that the wizard will use to build the wizard process that will be used to collect that information. Once this information has been loaded, the wizard presents the sequence of screens to the user and collects the user input.

Once that process is complete, the wizard can assemble the collected data into an XML data structure, save that XML data to the database for retrieval should the user want to edit the web application at a later date, and then builds the web application.

The wizard can build a web application by first reloading the wizard template. In addition to application configuration information, the template can contain a list of instructions telling the wizard which codewriters must be executed to build the web application. The wizard can load and execute each of those codewriters, passing the XML parameter data to the codewriters. The codewriters can use that XML parameter data to generate the blocks of code that make up the complete application.

After each code block is generated, the wizard can save it to an individual database record within the application project within the database.

Once all of the code blocks have been created and stored in the database, the wizard can assemble everything into a complete self-contained application script.

Once the web application script is complete, the wizard can install it into a website. The wizard can contain additional specialized tools to install and maintain applications within.

The wizard user interface can allow users to manage application projects, access wizard templates, and directly open the website, studio system, and Content Management System (CMS).

In one embodiment, the wizard can use a wizard template to:

create the sequence of screens used to collect application configuration information, initialize any necessary default variables required by the construction process, define and describe any fields used by the application forms or database, and prescribe a list of codewriters that must be executed to build the application.

Templates can contain a combination of XML and script code. Templates can be stored as script files within a templates directory under the root wizard directory. A typical installation can have several dozen wizard templates.

Figure 3:
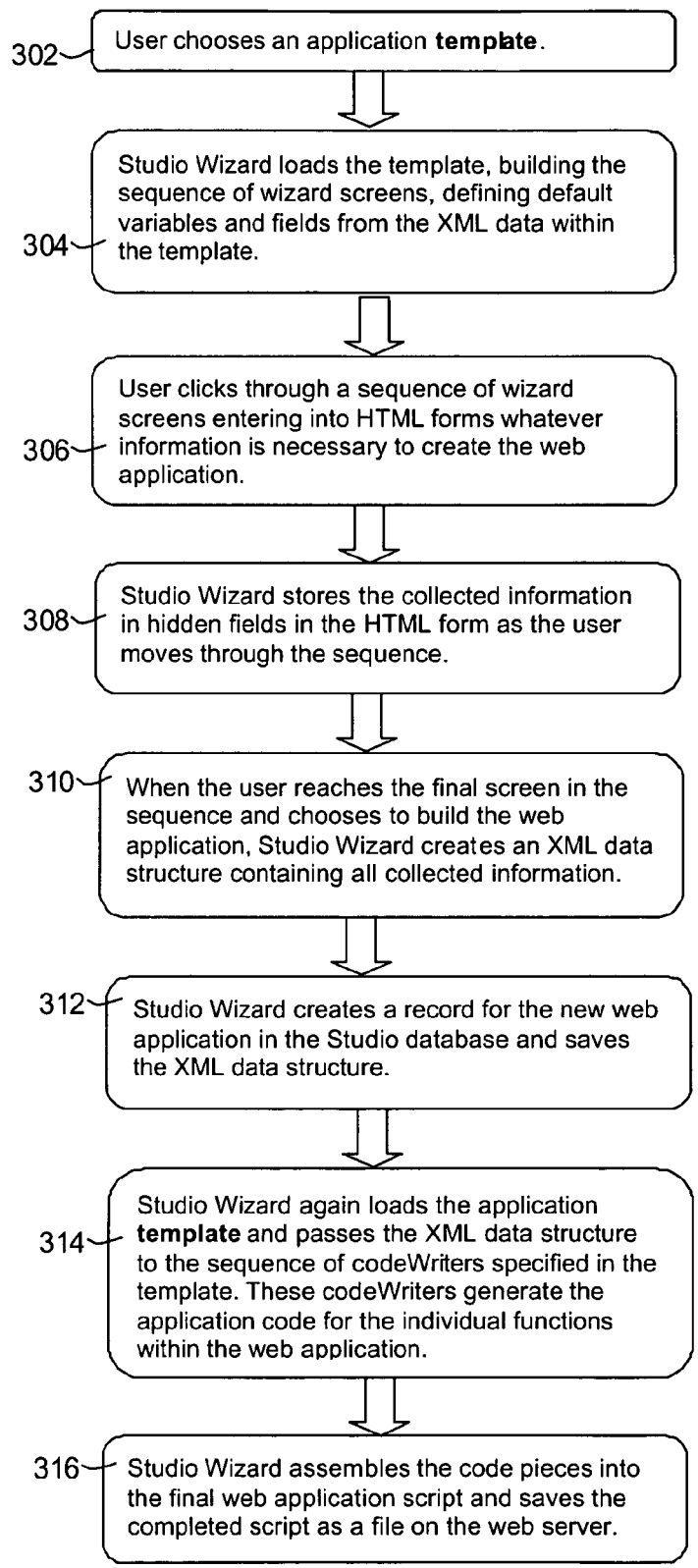
FIG. 3 illustrates the specific process used to create a new web application of one embodiment.

FIG. 3 shows a process to build a new web application.

In step 302, the user chooses an application template. The user can visit the templates page and chooses a template by double clicking its name.

In step 304, the wizard opens the requested template file and loads the wizard screen sequence, default variables, and field definitions from the XML data structure within the template file.

The wizard can build the first wizard screen by loading the Form component associated with the first screen.

In step 306, the user enters whatever configuration information is requested by the screenform component.

As the user clicks Next and moves through the sequence of screens, the wizard can continue to build the wizard screens and load the appropriate form components. In step 308, the configuration information collected by each screen can be saved into hidden form inputs that serve as temporary data holders and get transferred to each screen as it is loaded. The user can move backwards or forwards through the sequence of screens.

In step 310, when the final screen in the wizard sequence is reached, the user is presented with the option to build the web application. At this point, all the application configuration settings can be saved in hidden fields within an HTML form on the screen.

If the user elects to build the application, the hidden form can be submitted to the web server and the build process is started.

The wizard can convert all the configuration settings stored in hidden form fields into an XML data structure.

In step 312, the wizard can create a new empty project in the database for the new web application.

The XML data structure containing the application configuration settings can be saved to a database record within this project. This XML data structure can be used by the wizard to allow a user to edit and modify a web application at a later date.

In step 314, the wizard can again load the wizard template associated with this application and executes all of the codewriters that have been specified. The XML data structure containing the application configuration settings can be passed to each codewriter to use as necessary.

As each codewriter executes, it can generate a block of code that will be used to perform some function within the finished web application. As each block of code is generated, the wizard can create an "action" element within the Studio project database and stores that block of code in that element.

When all specified codewriters have been executed in step 316, the wizard can assemble the application script by retrieving all of the action elements from the Studio database and building a final script in the format required by the selected script language.

Once complete, the final script can then be installed into the website script directory as a "test version" of the application. Users can then test the application and make sure it runs correctly.

Figure 4:
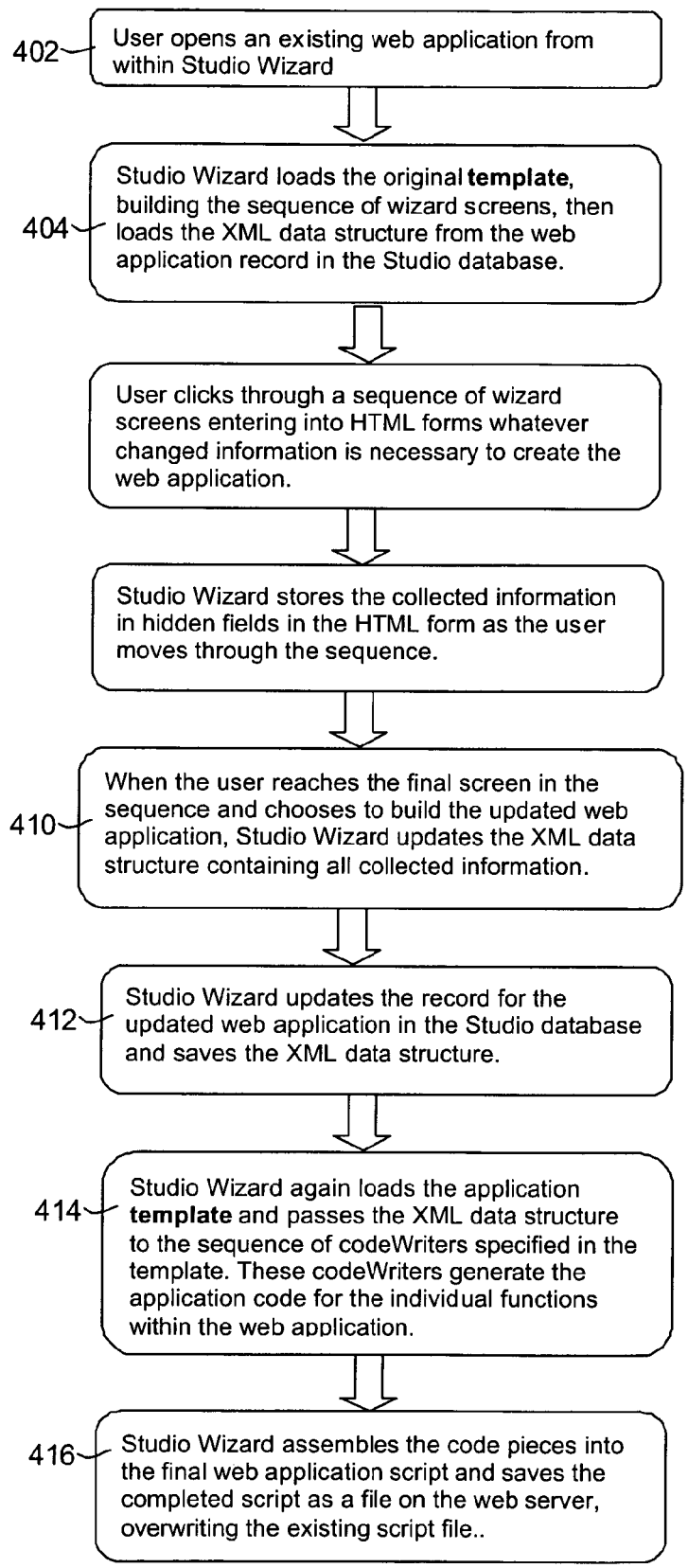
FIG. 4 illustrates the specific process used to edit an existing web application of one embodiment.

Once the user is satisfied that the application runs correctly, he/she can elect to install the script into the website as a finished project and make it available to website visitors. The wizard can do this by copying the "test" version of the script and installing it as a "finished" version FIG. 4 shows a process to edit an existing application.

The wizard can allow you to go back and modify applications after you've finished them. The process of modifying an existing application can be similar to creating a new one. In one embodiment, rather than moving through a sequence of wizard screens sequentially you can view and edit wizard screens in an arbitrary order.

In step 402, user visits the Projects screen and chooses which application to edit.

In step 404, the wizard can retrieve the XML data structure containing the application configuration information from the database record for the selected project.

The wizard can open the associated template file and loads the wizard screen sequence from the XML data structure within the template file.

The wizard can create a hidden form element for each configuration setting in the XML data and populates it with the configuration value. Each time a wizard screen loads, the collection of configuration settings is stored in the form as hidden form elements.

The wizard can build a tab bar containing a tab for each screen in the wizard sequence, and loads the form component associated with the first screen.

The user then can click any tab in the sequence and alter the configuration information displayed by that screen.

When the user has finished editing the application, the user can click the Save Settings button.

In step 410, the wizard then collects the configuration information from the hidden form elements. In step 412, the wizard can rebuild the XML data structure and save it back to the database record associated with the project.

The wizard again loads the wizard template associated with this application and execute all of the codewriters that have been specified. The XML data structure containing the application configuration settings can be passed to each codewriter to use as necessary.

As each codewriter executes, it generates a new block of code based on any edited configuration settings that may have changed. As each block of code is generated, the wizard then updates the associated "action" element within the Studio project database and stores that revised block of code in that element.

When all specified codewriters have been executed in step 416, the wizard can again assemble the application script by retrieving all of the action elements from the Studio database and building a final script.

Once complete, the final script can be reinstalled into the website script directory as a "test version" of the application. Users can then test the edited application and make sure it runs correctly.

Once the user is satisfied that the edited application functions correctly, they can elect to update the installed version of the "final" application. The wizard does this by overwriting the existing script file with the new one.

FIG. 5 shows the structure of a typical "form" component script of one embodiment.

FIG. 6 shows the structure of a typical "writer" component script of one embodiment.

FIG. 7A shows elements of a template file.

Figure 7B:
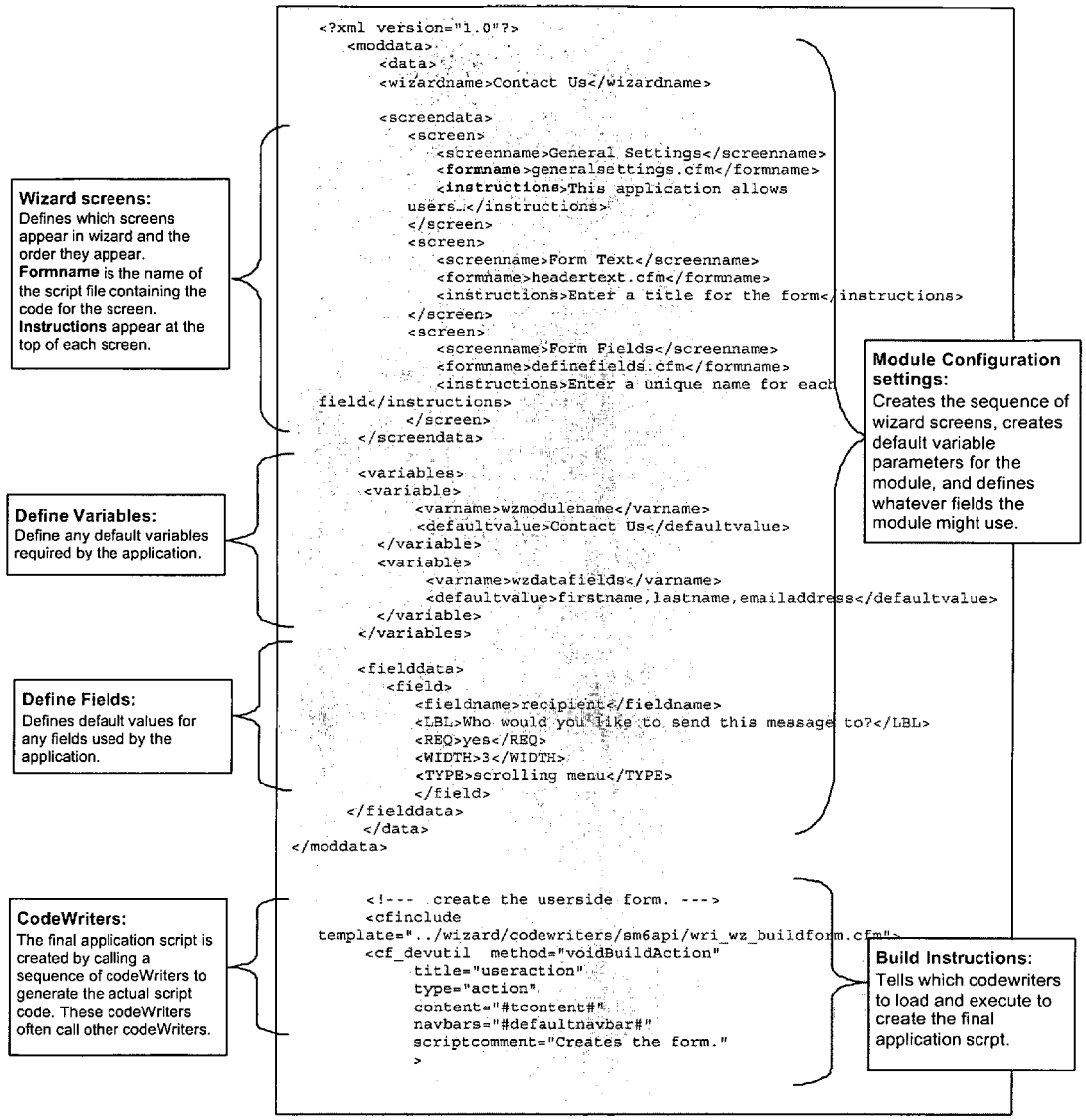
FIG. 7B shows the structure of a typical template file of one embodiment.

FIG. 7B shows the structure of a typical template file.

Figure 8:
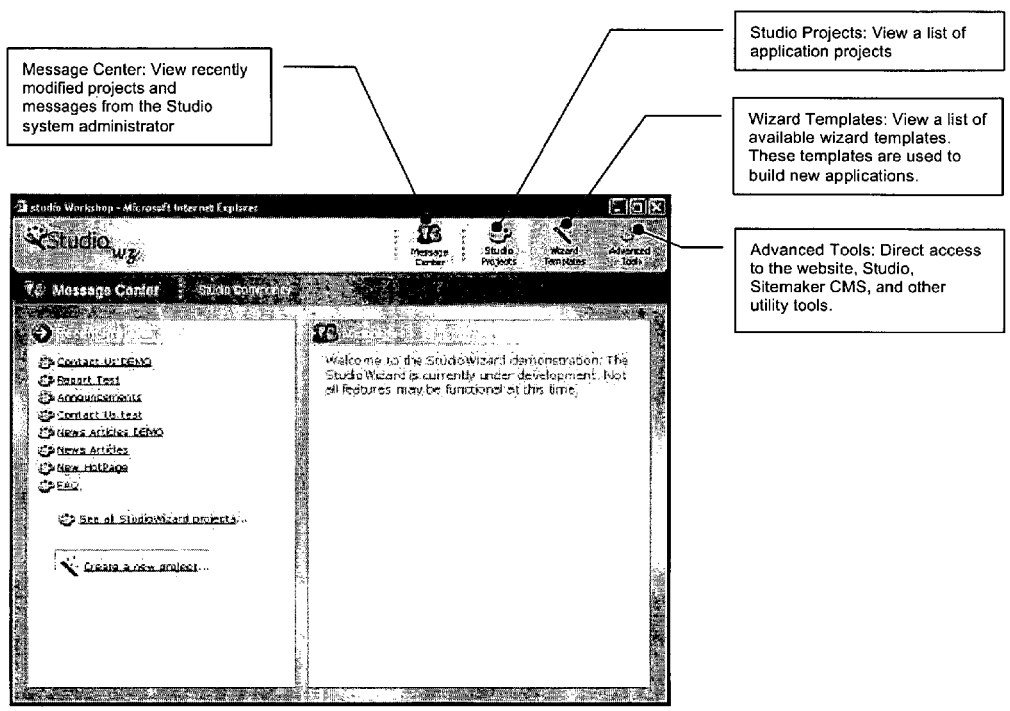
FIG. 8 shows the Message Center Screen of one embodiment.

FIGS. 8-12 show exemplary wizard screens of one embodiment. FIG. 8 illustrates a message center screen. This screen can used as the application homepage. From this page users can open projects that have been recently worked on and view any messages posted by the Studio system administrator.

Figure 9:
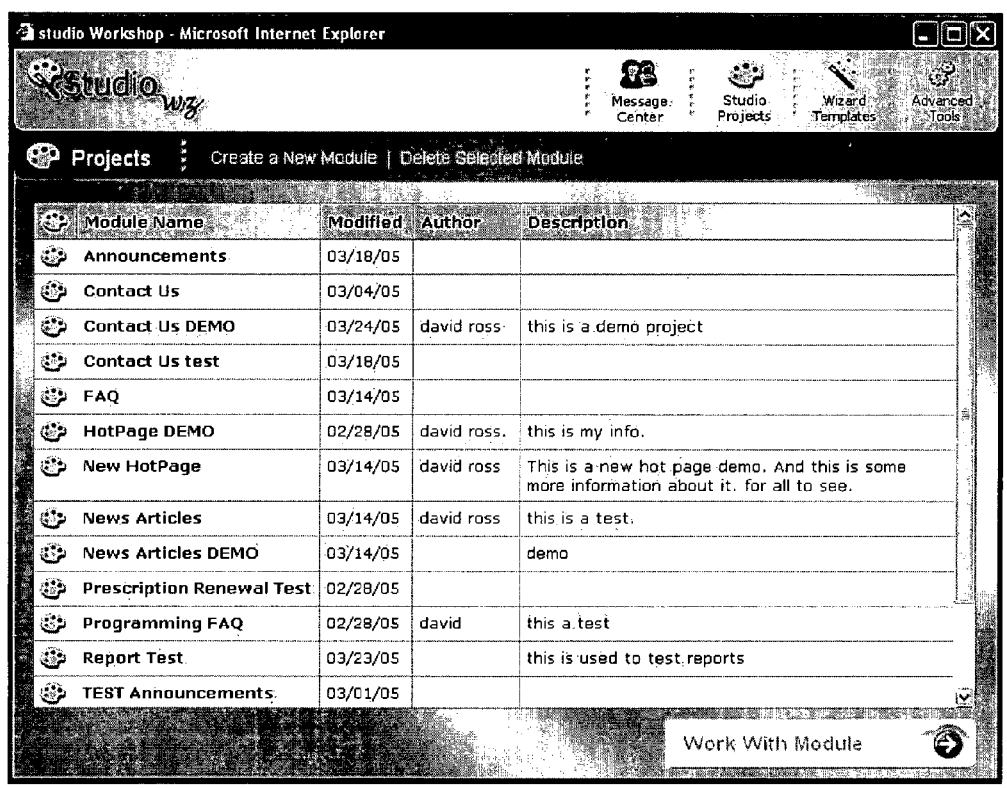
FIG. 9 shows the Project Listing Screen of one embodiment.

FIG. 9 illustrates a project screen that shows the wizard projects. This screen can be used to display a list of web application projects that have been built. From this page users can open a project for further editing.

Figure 10:
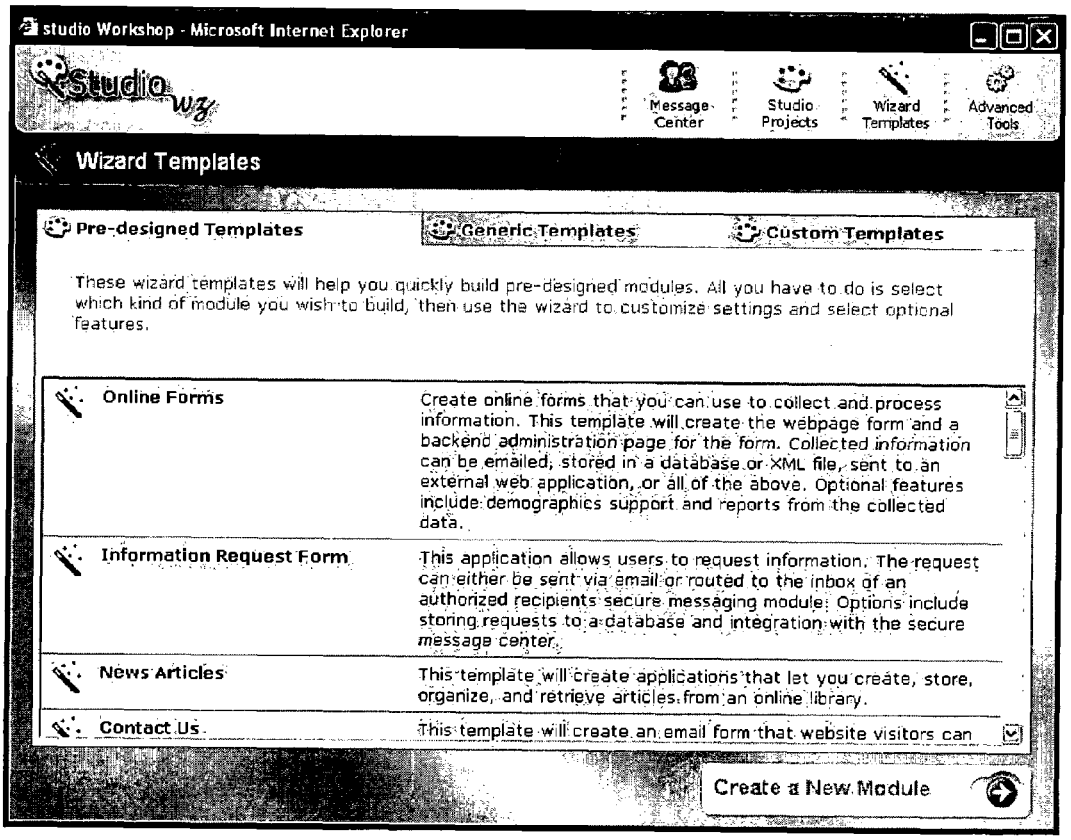
FIG. 10 shows the Template Listing Screen of one embodiment.

FIG. 10 illustrates a template screen which illustrates available templates that can be selected by the user to build new applications. This screen allows users to select from a list of available wizard templates from which users can build new applications.

Figure 11:
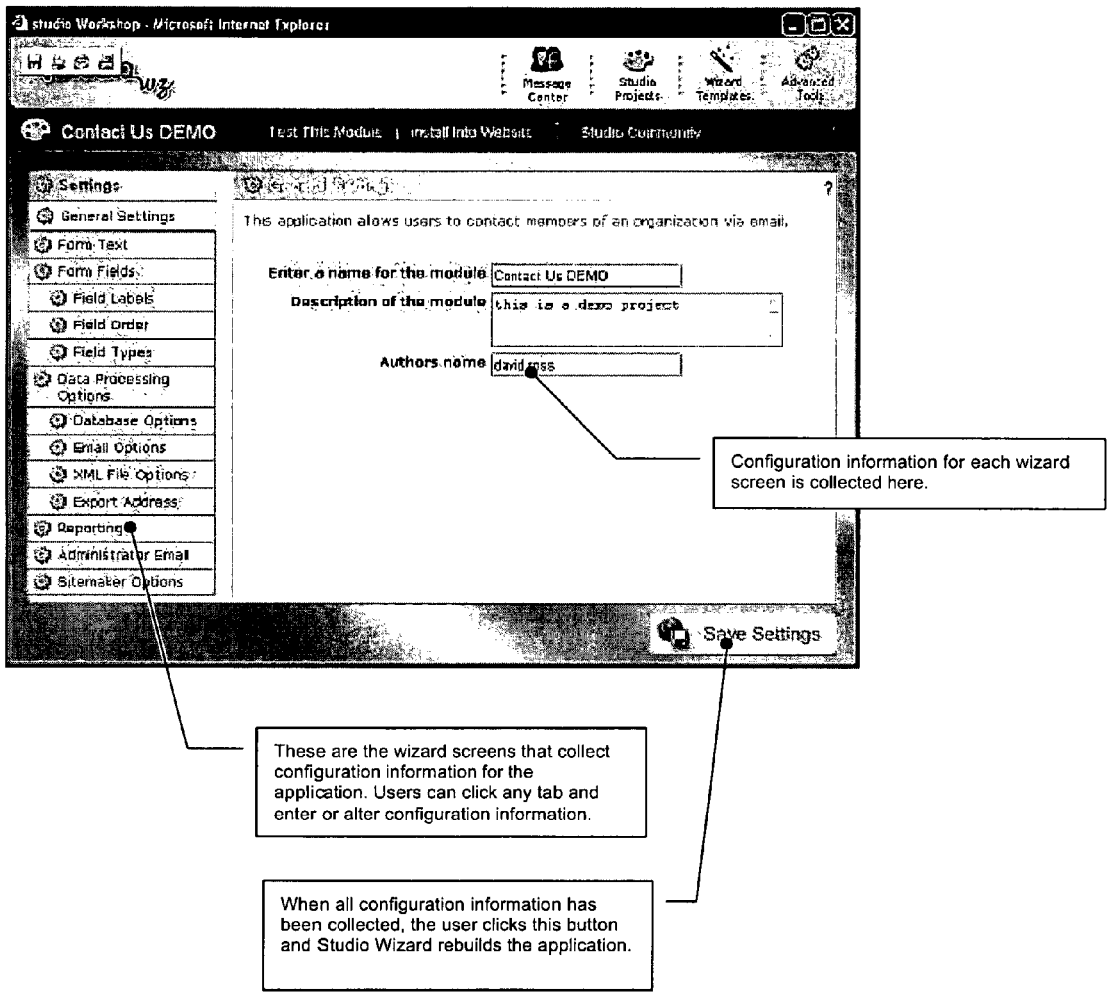
FIG. 11 shows the Project Screen for an individual application of one embodiment.

FIG. 11 illustrates a project screen that displays wizard tabs to allow users to select configuration screens from the wizard sequence. These screens can be used to modify existing projects. This screen allows you to edit the configuration settings for an existing application project.

Figure 12:
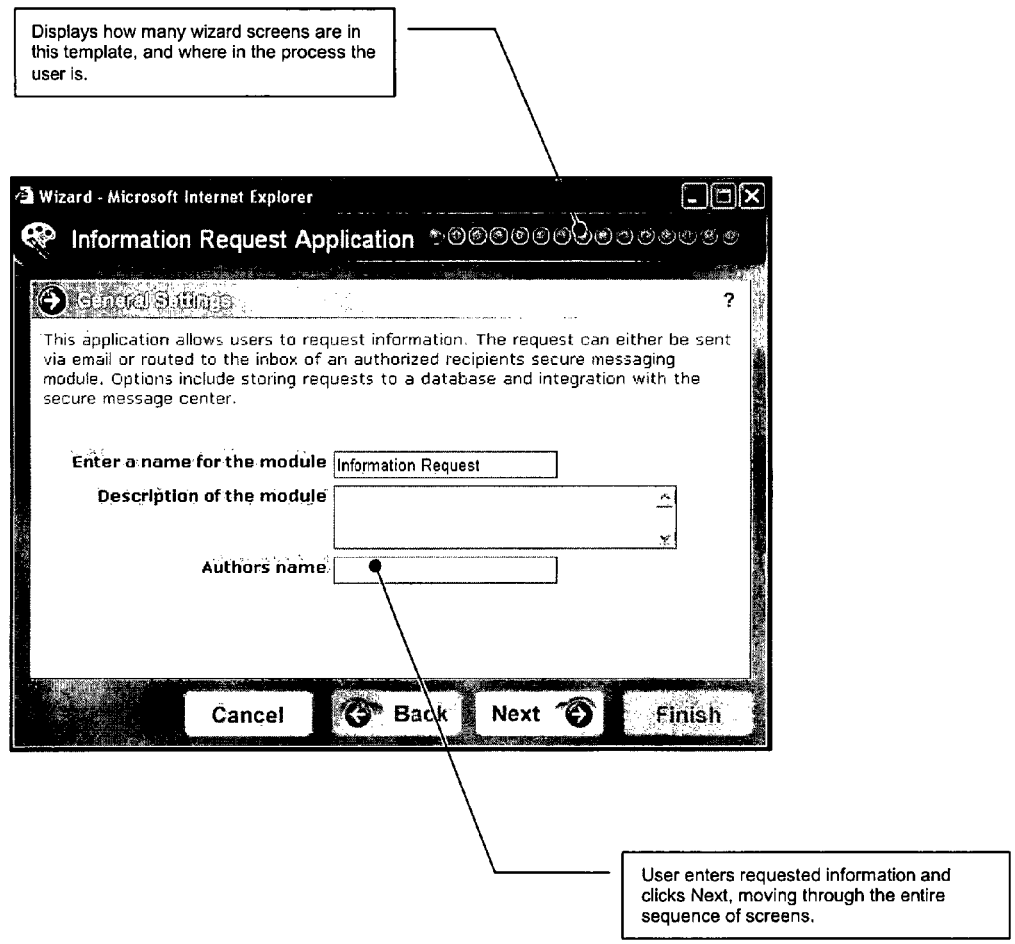
FIG. 12 shows a typical wizard screen of one embodiment.

FIG. 12 illustrates a typical wizard screen of the sequence of screens. The wizard screens can used to collect application configuration information necessary to build the web application. A typical template can contain maybe a dozen such screens.

Codewriters can allow complex web application functionality to be broken down into small chunks, easily modified, and reassembled into finished applications. By assembling these chunks of functionality in different ways even non-programmers can design, build, and edit some very complex applications.

Codewriters Can Allow the Following:
  complex functionality can be broken down into a collection of simple code blocks
  by collecting a few parameters, these code blocks can be easily rewritten to accommodate all kinds of customizations based on the parameters that are passed to the codewriter.
  Bug fixes, application enhancements, new features, and code that integrates applications with other applications can easily be added to entire collections of existing custom applications by modifying the codewriters.
  Consistency in code technique is applied to the entire collection of applications within a website or collection of websites.
  Codewriters can be designed to be small and simple and generally collect parameters and create blocks of code to implement the most basic elements of functionality within an application. This makes it easier to maintain a high degree of quality within the code produced by individual codewriters, which in turn makes it easier to guarantee that the final applications function properly.
  In one embodiment, there are two types of codewriters:
  Form components: Form components can be used by the wizard to build the wizard screens used to collect configuration information from the user. They can include HTML form elements (inputs, radio buttons, text boxes etc) that allow the user to input information. For example, a form component may collect a list of names that the user would like to use to build an onscreen form that can be used to collect information from a website visitor. Other form components may collect a list of labels that the user would like to apply to that form. And so on. A typical wizard template can contain around a dozen wizard screens, and each screen can have its own form component. A form component can consist of some HTML code stored in a script file within the Forms directory below the root wizard directory.
  Writer components: Writer components can be used by the wizard to generate the code blocks used by the web application. A writer component can accept the application configuration information collected by form components and use it to generate a block of custom code designed to perform a specific function within the web application in a way specified by the configuration information. For example, a writer component may take the list of fieldnames collected earlier and use it to generate the HTML code for the individual form elements in the onscreen form.

Figure 13:
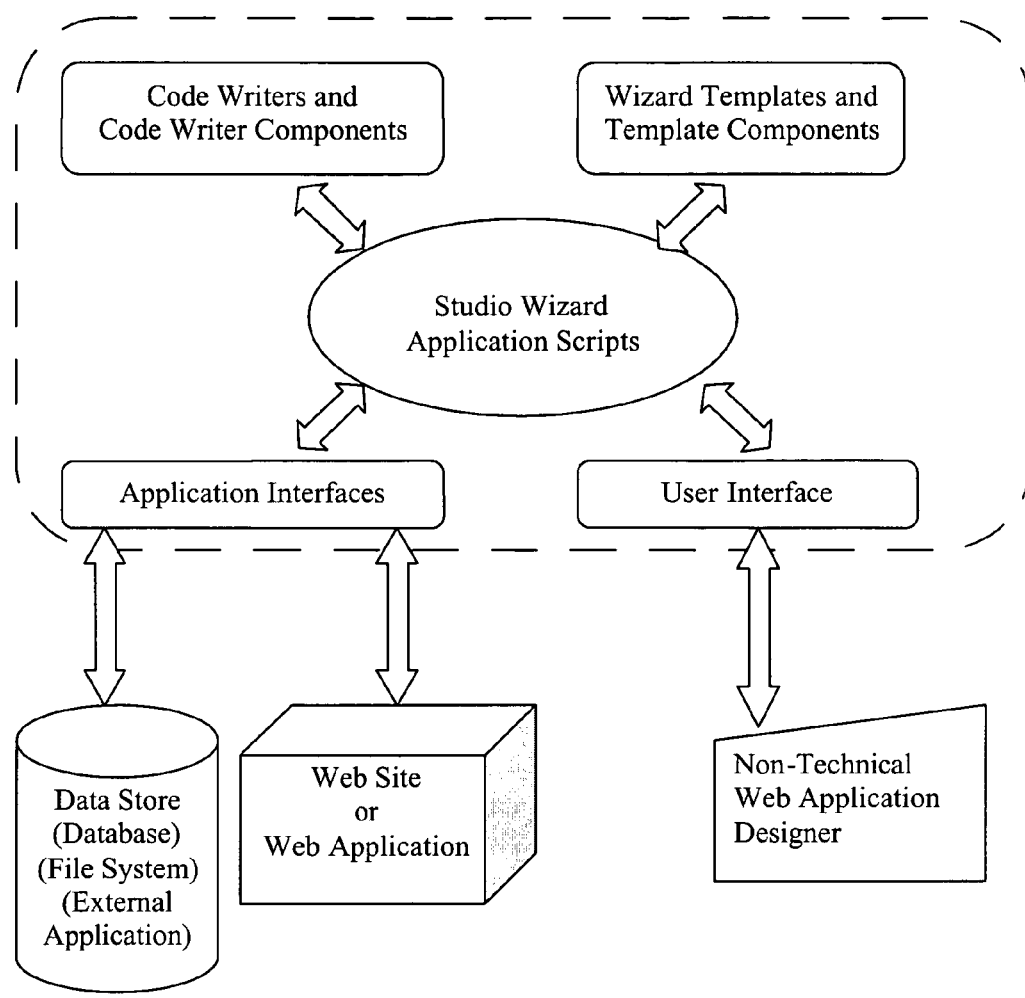
FIG. 13 shows components of a wizard of one embodiment.

FIG. 13 shows the major components of a wizard system of one embodiment. The wizard can provide the framework in which all the other components run. It can use wizard Templates to collect information on the features and makeup of the web application. It can use Code Writers to generate the actual code blocks of the web application. It uses the Application Interfaces to interact with the data storage medium, Web Site, and other Applications. All of this can be presented to the user through an "easy-to-use" User Interface.

Figure 14:
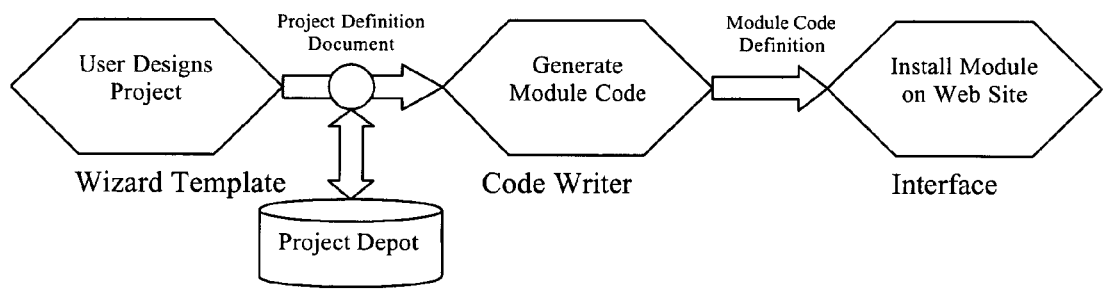
FIG. 14 shows a process to create applications of one embodiment.

FIG. 14 shows the process to create applications. The user designs the project using a wizard Template. The completion of the wizard results in a project definition document. Once created, the project can be saved for future editing in the Project Depot. The project definition document can then be used by a Code Writer to generate the module code. The module environment interface layer may then install the module into a Web Site for testing or production.

Within the Wizard User Interface, the above steps can be combined into simple commands, such as "Test This Project" or "Install into Website". This simplifies and accelerates the user experience.

Figure 15:
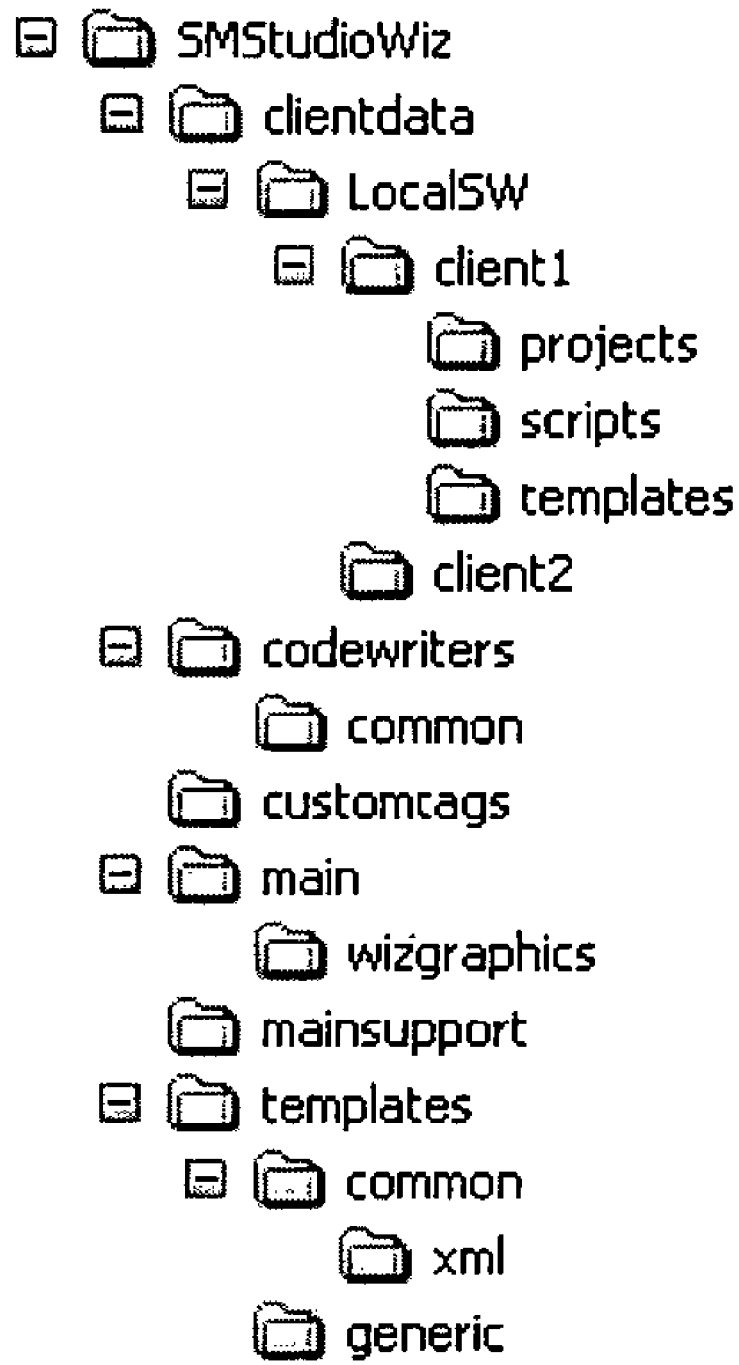
FIG. 15 shows a wizard directory of one embodiment.

FIG. 15 shows a wizard directory structure. Internet Information Services (IIS) can be configured to point directly to the main subdirectory, leaving the other directories unpublished over the web. Graphics used by the wizard can be locations in the wizgraphics subfolder.

The codewriters directory can contain the CFCs used for code writers. Predefined codewriters created as part of the wizard core can be contained in the common subfolder.

The customtags directory can contain shared CFCs and custom tags used throughout the wizard. The installation routine can register this custom tags folder in Cold Fusion Administrator. The mainsupport folder can contain CFCs and other files specifically associated with the wizard core.

The templates directory can contain CFCs for Wizard Templates. The subdirectory common can be for predesigned templates. The subdirectory generic can be for generic templates. For each of these directories, the subdirectory xml can contain the wizard definition files and initial project files for the corresponding wizards.

Client data, when stored within the wizard can reside under the clientdata directory. Under this directory can be the name of server for which data is being stored. The default server for stand-alone installations can be LocalSW. The subdirectory name can be the site ID associated with the site. For each site, the projects folder containing the Projects created on this site, the templates folder can contain site-specific Wizard Templates, and the scripts folder contains generated applications. These directories may be empty or not present when client data is stored in another application, such as SiteMaker CMS™ or SiteMaker Studio™.

The prefix "SW" can be used by the wizard for variable names, Uniform Resource Locator URL and form parameters, wizard action screens, wizard popup screens, validation names, and other places.

Templates can collect information from the user in order to create or modify a Wizard Project. In one embodiment, each Template can consists of three parts:

Wizard definition file—The XML document defines the steps of the wizard, the order in which the steps are displayed to the user, and information needed to process each step. This document also contains validation information.

Wizard action screens—The user interface that collects information at each step of the wizard process. This includes screens that handle popup windows from the main wizard screens.

Initial project file—The starting definition for a new project created by this wizard. This file can have the same XML structure as a Project definition file.

The above Wizard Template parts may all be located within a single wizard Cold Fusion Component (CFC) file, or the wizard screens may be located in the CFC file with the other parts located in separate XML files.

The Wizard Cold Fusion Component can extend the Base Wizard component smstudio.templates.wizBase. This base component contains a number of predefined wizard screens as well as several methods useful in creating custom wizard screens. The Base Wizard component can extend smstudio.customtags.swObject, thereby providing access to a number of predefined Wizard helper methods.

The method xmlGetInitialProjectData( ) can be called by the wizard to retrieve the initial project file. The wizard may simply create and return an initial project file, or allow the default implementation to load and return the file stored in the variable localdata.strInitialProjectXMLFile.

The method xmlGetWizardData( ) can be called by the wizard to retrieve the wizard definition file. The wizard may simply create and return the wizard definition, or allow the default implementation to load and return the file stored in the variable localdata.strWizardXMLFile.

The method sttDoWizardStep( ) can be called by the wizard to execute a specific wizard step. The wizard may implement its own version of this method, or allow the default implemention to execute. The default implementation executes a method sttWizFoo( ) where Foo is the wizard action of the current step.

The Base Wizard can predefine a number of wizard actions. All predefined actions follow the naming convention sttWizSWFoo( ). As with any object oriented system, predefined actions may be shadowed by custom versions of these actions, if desired.

The method sttDoProcessForm( ) can be called by the wizard to process form data from a completed wizard step. The wizard may implement its own version of this method, or allow the default implementation to execute. The default implementation reads form data and updates the information in the module definition file.

The wizard definition file can contain a list of the screens to be displayed for the wizard, as well as other information about the wizard. In one embodiment, this file can be an XML document with the following parts:

The root node of the XML document is <data>.

There is exactly one <screens> node under the <data> document root. The screens are an ordered collection under the <screens> node.

There are one or more <screen> nodes under the <screens> node. Each screen is a <screen> node and contains these elements:

<wizaction>—The name of the wizard action to execute at this step.

<displayname>—The title of the wizard screen for this step.

<instructions>—The instructions to display at the top of the screen for this step.

<helptext>—Help text to display under a Help Icon for this step.

<attributes>—Additional attributes of this screen. The supported attributes depend upon the <wizaction> selected.

There is also a <validations> node under the <data> document root. This section contains validation rules which are executed when data is saved in each step and/or when the wizard is completed (depending on the type of validation).

There are zero or more <rule> nodes under the <validations> node. Each <rule> node contains these possible elements:

<type>—The type of validation to execute. The interpretation of the additional elements below depends on the value of this element.

<nodefull>—The fully specified node on which this validation applies. This element may be repeated to apply the same rule to multiple nodes.

<nodematch>—The name of nodes on which this validation applies. In this case, only the name of the node itself is specified, not the full path. Therefore this element may match multiple nodes in the project definition file.

An example of a simple wizard with two screens is shown below. This wizard collects the general application settings and homepage introduction text. It has validation rules (for future use) to validate that custom columns in the base table are well-formed and valid field names and that all nodes that specify field names contain only valid, existing field names.

```
<?xml version="1.0" encoding="UTF-8"?>
<data>
<screens>
    <screen>
        <wizaction>swgeneralsettings</wizaction>
        <displayname>General Settings</displayname>
        <instructions>This template will create a minimal
        application.</instructions>
        <helptext></helptext>
        <attributes></attributes>
    </screen>
    <screen>
        <wizaction>swintrotext</wizaction>
        <displayname>Intro Text</displayname>
        <instructions>This text will appear on the module's userside
homepage. Enter a page title and whatever text you'd like to
appear.</instructions>
        <helptext></helptext>
        <attributes></attributes>
    </screen>
</screens>
<validation>
    <rule>
        <type>swcustomfieldlist</type>
        <nodefull>/data/database/tabledata/basetable/customcolumns/
        </nodefull>
    </rule>
    <rule>
        <type>swdefinedfields</type>
        <nodematch>/fields/</nodematch>
    </rule>
</validation>
</data>
```

A given Wizard Template may consist of any combination of pre-defined wizard screens or custom wizard screens. This section describes how to create a custom wizard screen.

While the wizard defines the framework and environment in which each wizard step executes, it is up to the wizard screen itself to determine what questions to display to the user and where the answers to those questions are stored in the module definition file.

The framework can automatically perform the following:

It creates a <form> to contain the form fields created by the wizard screen. The name and DHTML id of the form is "wizardform".

It performs client-side validation of form elements using a superset of the Cold Fusion server-side validation hidden form elements. It calls any custom validation in the JAVAScript™ functions customValidateFirst(formid) and/or customValidateLast(formid). These are called before and after the built-in validation, respectively. A return value of false stops form submission and further validation.

It tracks the current wizard step and navigates to the next appropriate or user-selected wizard step.

It tracks if the wizard data has changed and needs to be saved.

After the screen is submitted, the resulting data is passed to the sttDoProcessForm( ) method.

It tracks the current module definition file, including any unsaved data.

To implement a wizard screen, the wizard can have a corresponding method sttWizFoo(xmlWizData, sttWizActionAttributes)

The first input provided can be the module definition XML document for the current state of the module. The second input provided can be a structure containing several common attributes plus any special step attributes defined in the wizard definition file. The common attributes are intWizardStep—The position of the current wizard step in the sequence of steps.

strWizardAction—The name of the current wizard action, which in this example would be "Foo".

The output that the wizard screen method provides can be a structure. The following elements should be defined in the structure:

strHTML—The HTML to render within the form for this wizard step.

The purpose of a wizard template can be to produce a module definition file. The module definition file can be the complete description of all the information collected from a user in order to build the requested module. Therefore, all data collected in the wizard screens can be saved into the module definition file.

The wizard screen displays HTML form fields to the user. The user enters data in those fields, and then the data gets saved to the module definition file when the wizard calls sttDoProcessForm( ). Rather than having to create a custom implementation of sttDoProcessForm( ) in every wizard to process each form's data, there is a default implementation that automatically updates the module definition file from the form. This section describes how to create form fields that will be automatically processed by the default implementation of sttDoProcessForm( ). There may be cases where you will want to extend this method to handle advanced processing for a particular wizard screen, but in most, if not all cases, the standard processing will suffice.

The key concept is that, in one embodiment, the name of the form field corresponds to the node within the module definition file that should be updated with that form element.

In order to create the appropriate form field name from a node, use the Base Wizard method strNodeToForm( ). For example, to create an input form to populate the introduction text for the user search screen where the module definition file node is /data/actions/user/search/introtext, put the following input field into your wizard:

<input type="text" name="#strNodeToForm("/data/actions/user/search/introtext/")#">

You often wish to get the current default value of the node. For example,

```
<cfscript>
    strIntroNode = "/data/actions/user/search/introtext";
    strDefault =
        strGetXMLNodeValue(arguments.xmlWizData,strIntroNode);
</cfscript>
<cfoutput>
    <input type="text" name="#strNodeToForm(strIntroNode)#"
        value="#strDefault#">
</cfoutput>
```

There is one type of form element that requires special mention. The HTML form type of checkbox returns a value to the server only if the checkbox is checked. If the checkbox is unchecked, no value is returned. Therefore, the above mechanism alone will not capture the change of state of a checkbox field from checked to unchecked. To handle this case, sttDoProcessForm( ) looks for a special form field called checkboxfields. Set the value of this field to the name of the form element containing a checkbox. If the checkbox is unchecked, sttDoProcessForm( ) will apply the default value of FALSE. You may create as many fields named checkboxfields as needed.

```
<cfscript>
    strOptionNode = "/data/actions/user/search/useroption1";
    strDefault =
        (strGetXMLNodeValue(arguments.xmlWizData,strIntroNode)
        is "true");
</cfscript>
<cfoutput>
    <input type="checkbox" name="#strNodeToForm(strIntroNode)#"
        value="#strDefault#">
    <input type="hidden" name="checkboxfields"
        value="#strNodeToForm(strIntroNode)#">
</cfoutput>
```

The following is an example of a typical wizard screen. This screen enables the user to specify the data fields for a table:

```
<!---
SM: Documentation for sttWizDataFields
SM: Description:
--->
<cffunction name=" sttWizDataFields " access="public" output="no"
        returntype="struct" hint="Some wizard step.">
    <cfargument name="xmlWizData" type="any" required="yes"
        hint="The wizard data representation of this project.">
    <cfargument name="sttWizActionAttributes" type="struct" required="no"
        default="#structnew( )#" hint="Any additional wizard-specific
        action attributes the wizard needs.">
    <cfset var thismethod="sttWizDataFields">
    <cfset var sttReturn=structnew( )>
    <!--- SM: START sttWizDataFields IMPLEMENTATION CODE HERE --->
    <cfset var strTableName = listfirst(lstGetTables(arguments.xmlWizData))>
    <cfset var strNode = "/data/database/tabledata/#strTableName#/customcolumns">
    <cfset var strOut = "">
    <cfset var strValue = replace(strGetXMLNodeValue(arguments.xmlWizData,strNode),
                    ",","#chr(10)#","all")>
    <cfsavecontent variable="strOut">
    <cfoutput>
        <input type="hidden" name="#strNodeToForm(strNode)#_required"
            value="You must enter at least one field name.">
        <div style="position:relative;top:0;left:40;cursor:default;">
        <table class="wizform">
        <tr>
            <th class="wizform">Field names</th>
            <td class="wizform">
                <textarea cols="22" rows="12" name="#strNodeToForm(strNode)#">
                #strValue#
                </textarea>
            </td>
        </tr>
        </table>
        </div>
    </cfoutput>
    </cfsavecontent>
    <cfset sttReturn.strHTML = strOut>
    <!--- SM: END sttWizDataFields IMPLEMENTATION CODE HERE --->
    <cfreturn sttReturn>
</cffunction>
```

In some cases a single wizard step needs to collect more data than will fit within a single screen. Often this data is additional options or configuration that provides more detail to the choices being offered on the wizard screen itself. Rather than requiring the creation of additional wizard steps, the wizard supports a mechanism for creating popup screens that launch via a button on the main wizard screen, collect data, and then store that data back into the main wizard screen. There may be multiple popups on a single wizard screen.

To create a wizard screen, you following items can be implemented:

A button on the main wizard screen to launch the popup.
A method to render the popup window.

To create the button, use the wizBase method strCreatePopupButton( ) or the alternate method strCreatePopupButtonFromXMLNode( ). These methods accept parameters to specify the text and style of the popup button, the size of the popup window to create, and the target popup method to call within the popup window. For example, the following call will create a button labeled "My Popup" that will launch a popup window of the default size and execute the popup action "Foo" with an additional argument of param=42:

```
<cfoutput>
#strCreatePopupButton(
    strButtonText="My Popup",
    strPopupAction="Foo",
    strPopupArguments="param=42"
    )#
</cfoutput>
```

In one embodiment, to implement a popup action, the wizard has a corresponding method sttPopupFoo(xmlWizData, sttPopupAttributes)

The first input provided is the module definition XML document for the current state of the module. The second input provided can be a structure containing the additional arguments passed to the strCreatePopupButton( ) method.

The output that the popup screen method provides is a structure. The following elements should be defined in the structure:

strHTML—The HTML to render within the form for this popup.

It is occasionally necessary to ensure that the options selected by the users when they create or edit a project do not violate some defined rules and cause inconsistencies or errors within the resulting generated module. Therefore the wizard can provide a mechanism to define some basic validation rules as well as to create your own validation rules.

Builtin validation rules may be automatically invoked by defining on which nodes to apply the rules. This is done in the <validations> node of the Wizard Definition File. Under the <validations> node, one can create a <rule> node for each rule you wish to invoke.

For each <rule>, one can specify the type of validation you wish to execute with a <type> node, and which nodes the rule applies to using the <nodefull> and <nodematch> elements. These elements are defined as follows:

<type>—The type of validation to execute. The interpretation of the additional elements below depends on the value of this element.

<nodefull>—The fully specified node on which this validation applies. This element may be repeated to apply the same rule to multiple nodes.

<nodematch>—The name of nodes on which this validation applies. In this case, only the name of the node itself is specified, not the full path. Therefore this element may match multiple nodes in the project definition file.

In one embodiment, the following built-in validation types have been defined:

swcustomfieldlist—The node contains a comma-separated list of field names. These field names are valid database column names, do not contain duplicates, and do not conflict with and built-in field names for this project.

swdefinedfields—The node contains a comma-separated list of field names. These names are active fields for this project, including built-in or custom fields.

swrequired—The node exists and contains a non-blank value. This validation is only executed before a module is generated, not for each wizard step.

Additionally, the nodes can be validated to not contain any Cold Fusion tags. Nodes may contain HTML tags, but not Cold Fusion tags.

In one embodiment, to implement custom validation, one must override the validation methods in wizBase. The validation methods are:

strApplyValidationRuleToString(xmlWizData, strValidationType, strValue)—This method executes the specified validation to the specified value. If a silent fix is possible or the value is valid, it returns a valid value. If a silent fix is not possible, it throws an "smstudio.validation" error.

arrValidateXMLData(xmlWizData)—This method validates an entire project definition document. It returns an array of issues found, including errors and warnings. It fixes nodes that can be silently fixed. The return value is an array of structures with these elements:

strLevel—One of the values "Warning" or "Error".

strNode—The node in the document with the issue.

strComment—Information about the validation issue or fix made.

The initial project file follows the identical format as the module definition file of an in-progress or completed project (minus any installation tracking information). In fact, a completed module definition file often makes a good starting point for defining your own custom initial project file for a custom wizard template. See the section Sample Project XML below for a full description of the module definition file's XML format.

It is useful to note that the module definition file will ultimately contain all the information the code writer will need to create the actual module. It may therefore be convenient to observe that a custom wizard template that uses a standard or generalized code writer may contain elements within its initial project file that are never presented by the wizard to the user. These "fixed" elements are passed to the code writer and are used to create the module code, but may be uncustomizable. This provides a mechanism to create many similar, but different, wizard templates that use a single code writer.

The project file, or module definition file, is an XML document that contains all the information required to build and install a module. It contains information about what wizard template created it, what code writer to use to produce the module, what options and features have been chosen by the user during the wizard execution, and what preconfigured options and features exist in the module.

Some sections of this XML document are standard and exist in every project. Some sections are custom. A particular wizard and code writer can create any sections needed in order to define the project, as long as both the wizard and code writer have been designed to interpret those sections.

Each module definition file can contain a root node <data>. Below the root note, the main sections of the XML document can be:

<header>—This section contains general module information, such as the wizard template and code writer to use, the name and description of the module, and installation information. This section is common across all projects.

<database>—This section contains the database schema for the module, as well as any field-specific information or properties. The structure of this section is common across all projects.

<options>—This section contains general module options that broadly apply to the entire module. Examples include workflow or multilingual features. The options available vary from project to project.

<actions>—This section contains options and features that apply on a screen-by-screen basis for the module. The details of this section are typically code writer specific.

Common nodes present in all modules include <name>, <description>, <author>, and <lastupdate>. These are self-explanatory. Modules to be built for SiteMaker CMS 6.0 include the nodes <moduleguid> and <defaultbasename>. The <moduleguid> is a registered SM6 module GUID to be used for this module. The <defaultbasename> is the prefix name to be used for the module's CFC file or table, unless a conflict already exists on the site. If there is a name conflict, then a new basename will be chosen and used, and this value will be updated by the wizard.

The <wizard> section can define the wizard template used to edit this project. The <class> subnode defines the wizard template class.

The <codewriter> section can define the code writer to be used to create a module for this project. The <class> subnode can identify the code writer's class file and the <method> subnode can define the method in that class file to execute.

The <installations> section can track where and when this project has been installed in order to support updates and versioning of installed modules. This section can be created and managed by the wizard.

The database section can define the schema of the module. The <tables> node can give the list of tables in the module that should be built (The project file may define inactive tables. These tables will not be built until they are made active). The <tabledata> node can contain the definition for each table, with the name of the table being the name of the node under the <tabledata> node.

For each table, the <builtincolumns> node can list those columns that are required in that table and may not be changed. The <customcolumns> node can list those columns that are created or configured by the user through the wizard template. In one embodiment, only those columns represented by these two nodes will actually be built into the schema.

For each table, the <schema> node can detail each field within the table. In one embodiment, the properties available to each field are a superset of those available in a SiteMaker CMS v6.0 module installation XML file. Additional properties can be present to define the default display attributes of each field, beyond the database schema.

The options section can contain general module options. The options supported depend on the code writers used. One generally supported option is <sitemakeroptions>, which supports subnodes with true/false values for each common SiteMaker option. The option node <adminemail> can be used to set a general administrative email for this module. This section may be used to support features normally available in a module configuration screen, thereby allowing the use of the wizard to directly configure module properties in the code, rather than requesting data from the user at run-time.

The actions section can have two subnodes: <user> and <admin>, corresponding to the public and administrative sides of the module, respectively. Within each of these sections, each subnode corresponds to a specific module action, with the name of the subnode matching the module action. In one embodiment, these nodes are present only to contain non-default options for these actions. The absence of a particular action node within the project document does not mean that the particular action is not present. It only means that the default behavior, if any, for that action will be implemented by the code writer.

An example use of this section would be to add a particular administrative action to the administration menu bar. Under the desired action the <istopmenuitem> would be set to TRUE and <topmenuname> would be set to the desired display text.

Another example of the use of this section would be to specify what fields are to be used within this action and in what order, using the <fields> subnode. This might apply to configurable search, list, or detail pages.

```
<?xml version="1.0" encoding="UTF-8"?>
<data>
    <header>
        <name>FAQ Module</name>
        <description>This is a sample FAQ module</description>
        <author>Default Administrator</author>
        <lastupdate>06/09/2005 04:57:31 PM</lastupdate>
        <moduleguid/>
        <defaultbasename>modWZeLibrary</defaultbasename>
        <wizard>
            <source>common</source>
            <class>wizeLibrary</class>
            <version>1.0</version>
        </wizard>
        <codewriter>
            <source>common</source>
            <class>cweLibrary</class>
            <method>sttCWMGenerate</method>
        </codewriter>
    </header>
    <database>
        <tables>basetable,basetablelookup</tables>
        <tabledata>
            <basetable>
                <builtincolumns>ref</builtincolumns>
                <customcolumns>question,answer</customcolumns>
                <schema>
                    <ref>
                        <prettyname>Ref</prettyname>
                        <builtin>true</builtin>
                        <renderas>simpletext</renderas>
                        <datatype>int</datatype>
                        <identity>(1,1)</identity>
                        <primaryKey>true</primaryKey>
                    </ref>
                    <question>
                        <prettyname>question</prettyname>
                        <datatype>varchar</datatype>
                        <renderas>simpletext</renderas>
                        <requiredinput>false</requiredinput>
                        <formwidth/>
                        <defaultvalue/>
                    </question>
                    <answer>
                        <prettyname>answer</prettyname>
                        <datatype>text</datatype>
                        <secured>false</secured>
                        <renderas>longtext</renderas>
                        <requiredinput>false</requiredinput>
                        <formwidth/>
                        <defaultvalue/>
                    </answer>
                </schema>
            </basetable>
            <basetablelookup>
                <builtincolumns>ref,keyvalue,groupid</builtincolumns>
                <schema>
                    <ref>
                        <builtin>true</builtin>
                        <datatype>int</datatype>
                        <identity>(1,1)</identity>
                        <primaryKey>true</primaryKey>
                    </ref>
```

```
            <keyvalue>
                <builtin>true</builtin>
                <renderas>simpletext</renderas>
                <datatype>varchar</datatype>
                <length>255</length>
            </keyvalue>
            <groupid>
                <builtin>true</builtin>
                <renderas>simpletext</renderas>
                <datatype>varchar</datatype>
                <length>255</length>
            </groupid>
        </schema>
    </basetablelookup>
</tabledata>
</database>
<actions>
    <admin>
        <new>
            <istopmenuitem>true</istopmenuitem>
            <topmenuname>New Record</topmenuname>
        </new>
        <search>
            <istopmenuitem>true</istopmenuitem>
            <topmenuname>Edit or Delete
            Record</topmenuname>
            <keywordsearch>true</keywordsearch>
            <fields>question</fields>
            <suppresspage>false</suppresspage>
            <fields_text>question</fields_text>
        </search>
        <welcome>
            <introtext>Welcome</introtext>
        </welcome>
        <list>
            <fields>ref,question</fields>
            <fields_text>ref,question</fields_text>
        </list>
    </admin>
    <user>
        <search>
            <keywordsearch>true</keywordsearch>
            <fields>question</fields>
            <suppresspage>false</suppresspage>
            <fields_text>question</fields_text>
        </search>
        <list>
            <fields>ref,question</fields>
            <printthispage>false</printthispage>
            <verticalpagelayout>false</verticalpagelayout>
            <fields_text>ref,question</fields_text>
        </list>
        <detail>
            <fields>ref,question,answer</fields>
            <emailafriend>true</emailafriend>
            <printthispage>true</printthispage>
            <suppresspage>false</suppresspage>
            <fields_text>ref,question,answer</fields_text>
        </detail>
    </user>
</actions>
<options>
    <sitemakeroptions>
        <includeconfig>false</includeconfig>
        <workflow>false</workflow>
    </sitemakeroptions>
</options>
</data>
```

Code Writers can use the information in a module definition file to create the source code for a module or application. In one embodiment, there are three levels to the code writer architecture:

Atoms create code segments in a native software language, such as Cold Fusion, to perform a specific piece of functionality, such as writing a record to a database or drawing a form.

Molecules perform all the necessary steps to create a single, functional unit in response to a single user request. An example would be to render a new record page. Molecules perform their functions by combining one or more Atoms together in a specific way.

Compounds are collections of molecules that form a complete module or an entire functional area of a module. An example would be a News Module. Compounds perform their functions by combining one or more Molecules and, optionally, one or more Atoms together.

In order to provide the greatest platform independence of the output code, it is desirable that native code segments are only created within Atoms. There may be cases where it is necessary to create native code segments in other layers, but this limits the reusability of these other layers and should be avoided.

General Atoms that write code native to the SiteMaker CMS v6.0 Cold Fusion CFC modules are located within the class cfAtomCFC.cfc. See the reference information for full details on the currently supported Atoms.

All Atom methods return strings; however, each Atom accepts inputs that are appropriate to that Atom's function. There is not, therefore, a single signature for all Atom methods. The naming convention for Atoms is strCWFoo( ).

The following is an example of a simple Atom method that creates Cold Fusion code for the SiteMaker CMS version 6 API:

```
<!---
    SM: Documentation for strCWRenderAdminTitle
    SM: Description: CW: Renders the title of the specified administration page.
--->
<cffunction name="strCWRenderAdminTitle" access="public" output="no" returntype="string" hint="CW: Renders the title of the specified administration page.">
    <cfargument name="strText" type="string" required="yes" hint="The actual text string to be rendered or the variable name containing it.">
    <cfargument name="strType" type="string" required="no" default="TEXT" hint="The source of the help text:<br>TEXT - The help text is the actual string strText.<br>VARIABLE - The help text is in a variable, whose name is in strText.">
    <cfset var thismethod="strCWRenderAdminTitle">
    <cfset var strReturn="">
    <!--- SM: START strCWRenderAdminTitle IMPLEMENTATION CODE HERE --->
    <cfset var strRenderText = "">
```

```
    <cfif arguments.strType is "TEXT">
        <cfset strRenderText = arguments.strText>
    <cfelseif arguments.strType is "VARIABLE">
        <cfset strRenderText = "###arguments.strText###">
    <cfelse>
        <cfthrow message="Invalid Type (#arguments.strType#) in method
#this.thisclass#:#thismethod#." type="sm6studio.invalidargument">
    </cfif>
    <cfset strReturn = '
    <cfoutput>
        ##this.sttVerbage.STYLE_HEAD_START##
        #strRenderText#
        ##this.sttVerbage.STYLE_HEAD_END##
    </cfoutput>
    '>
    <!--- SM: END strCWRenderAdminTitle IMPLEMENTATION CODE HERE --->
    <cfreturn strReturn>
</cffunction>
```

General Molecules can be located within the class cwMolecule.cfc. Since each molecule performs the function of a single action, the naming convention for molecules can follow the default action name for the resulting method produced. All molecule methods follow the same method signature. Each can accepts the following inputs:

xmlWizData—The module definition file for this project.

strMethodName—The name of the actual method to be implemented (with a default).

strScreenDefinitionNode—The node in xmlWizData that corresponds to the screen being implemented by this molecule method.

bolIsAdmin—A Boolean parameter specifying if this is an administration action, or a user action.

Each molecule method can returns a Cold Fusion structure with the following elements:

strMethodName—The name of the produced method.

strHint—Help text to associate with the produced method.

strCode—The raw native code to execute this method, including headers.

If the default action for a method is Foo, the method would be called sttCWFoo( ). If more than one method is required that default to the same action name, each method should be numbered: sttCWFoo1( ), sttCWFoo2( ), etc.

The following is an example of a Molecule method that creates a new record screen:

```
<!---
    SM: Documentation for sttCWNew
    SM: Description: CW Method: Creates a method to create a new record.
--->
<cffunction name="sttCWNew" access="public" output="no" returntype="struct" hint="CW
Method: Creates a method to create a new record.">
    <cfargument name="xmlWizData" type="any" required="yes" hint="The wizard data
representation of this project.">
    <cfargument name="strMethodName" type="string" required="no" default="new" hint="An
alternate method name to use.">
    <cfargument name="bolIsAdmin" type="boolean" required="no" default="TRUE" hint="TRUE if
creating a method for the administration side of the project.">
    <cfargument name="sttOptions" type="struct" required="no" default="#structnew( )#"
hint="Options specific to this CW method. No options defined at this time.">
        <cfset var thismethod="sttCWNew">
        <cfset var sttReturn=structcopy(sttGenericReturn)>
        <!--- SM: START sttCWNew IMPLEMENTATION CODE HERE --->
        <cfset var strPrefix = IIF(arguments.bolIsAdmin,DE("admin"),DE("user"))>
        <cfset var strNode = "/data/actions/#strPrefix#/#arguments.strMethodName#/fields">
        <cfset var lstFields = strGetXMLNodeValue(arguments.xmlWizData,strNode)>
        <cfset var arrFieldInfo = "">
        <cfset var sttFormProps = structnew( )>
        <cfset var strBaseNode = "/data/actions/#strPrefix#/#arguments.strMethodName#/">
        <cfset strNode = "#strBaseNode#/fields">
        <cfscript>
            sttReturn.strMethodName = strPrefix & "Action" & arguments.strMethodName;
            sttReturn.strHint = "This method creates a new record screen.";
        </cfscript>
        <!--- Handle case of lstFields blank - Get all fields in primary table. --->
        <cfif lstFields is "">
            <cfset lstFields = lstGetFields(xmlWizData=arguments.xmlWizData)>
        </cfif>
        <cfset arrFieldInfo = objCWAtom.arrCreateFieldArray(arguments.xmlWizData,lstFields)>
        <cfset sttFormProps.action = arguments.strMethodName & "post">
        <cfset sttFormProps.cssclassfile="projectadmin.css">
        <cfset sttFormProps.cssclass="sm6general">
```

```
    <cfset sttReturn.strCode =
    objCWAtom.strCWCreateMethodHeader(strMethodName=sttReturn.strMethodName,strHint=sttReturn.strHint)
&
        objCWAtom.strCWDeclareLocalVariables("objPage,objField,objFieldSet") &
        objCWATom.strCWRenderAdminTitle(strText="New Record") &
        objCWAtom.strCWRenderForm(arrFieldList=arrFieldInfo,sttProperties=sttFormProps) &
        objCWAtom.strCWCreateMethodFooter(strMethodName=sttReturn.strMethodName,strHint=sttReturn.strHint)
    >
    <!--- SM: END sttCWNew IMPLEMENTATION CODE HERE --->
    <cfreturn sttReturn>
</cffunction>
```

The Compound for a specific module can accept as input only a single parameter, the module definition file for the project. It can return a Cold Fusion structure with the following elements:

arrMethods—An array of the methods to create. Each element of this array is a structure with the same elements as are returned from a Molecule method.

strHeader—Header code for the top of the module file.

strInitialization—Additional header code for the top of the module file. Output after strHeader but before the methods.

strFooter—Footer code for the bottom of the module file.

The following is an example of a Compound method that builds a basic module:

```
<!---
    SM: Documentation for sttCWMGenerate
    SM: Description: Creates a simple project with a user side and admin side. The standard
actions include new, edit, search, and list on the admin side and search, list, detail on
the user side. Returns a module code definition structure.
--->
<cffunction name="sttCWMGenerate" access="public" output="no" returntype="struct"
hint="Creates a simple project with a user side and admin side. The standard actions
include new, edit, search, and list on the admin side and search, list, detail on the user
side. Returns a module code definition structure.">
    <cfargument name="xmlWizData" type="any" required="yes" hint="The wizard data
representation of this project.">
        <cfset var thismethod="sttCWMGenerate">
        <cfset var sttReturn=0>
        <!--- SM: START sttCWMGenerate IMPLEMENTATION CODE HERE --->
        <cfset var sttOptions = "">
        <cfscript>
            sttReturn = sttGetBlankModuleCodeDefinition( );
            sttReturn.strHeader = objCWAtom.strCWCreateComponentHeader(strHint="Studio Wizard
Generated Project from class #this.thisclass#");
            sttReturn.strInitialization = "";
            sttReturn.arrMethods = arrGetCategoryEditMethods(arguments.xmlWizData);
            // Admin side
            arrayappend(sttReturn.arrMethods,objCWMolecule.sttCWCreateTopMenu(xmlWizData=arguments.xml
WizData));
            arrayappend(sttReturn.arrMethods,objCWMolecule.sttCW(xmlWizData=arguments.xmlWizData,bol
IsAdmin=true));
            arrayappend(sttReturn.arrMethods,objCWMolecule.sttCWNew(xmlWizData=arguments.xmlWizData,
bolIsAdmin=true));
            arrayappend(sttReturn.arrMethods,objCWMolecule.sttCWNewPost(xmlWizData=arguments.xmlWizData,
bolIsAdmin=true));
            arrayappend(sttReturn.arrMethods,objCWMolecule.sttCWEdit(xmlWizData=arguments.xmlWizData,
bolIsAdmin=true));
            arrayappend(sttReturn.arrMethods,objCWMolecule.sttCWEditPost(xmlWizData=arguments.xmlWiz
Data,bolIsAdmin=true));
            arrayappend(sttReturn.arrMethods,objCWMolecule.sttCWDeletePost(xmlWizData=arguments.xmlWiz
Data,bolIsAdmin=true));
            arrayappend(sttReturn.arrMethods,objCWMolecule.sttCWSearch(xmlWizData=arguments.xmlWizData,
bolIsAdmin=true));
            arrayappend(sttReturn.arrMethods,objCWMolecule.sttCWList(xmlWizData=arguments.xmlWizData,
bolIsAdmin=true));
                // User side
                sttOptions = structnew( ); sttOptions.strTargetAction = "userActionSearch";
            arrayappend(sttReturn.arrMethods,objCWMolecule.sttCWGotoAction(xmlWizData=arguments.xmlWiz
Data,strMethodName="",bolIsAdmin=false,sttOptions=sttOptions));
            arrayappend(sttReturn.arrMethods,objCWMolecule.sttCWSearch(xmlWizData=arguments.xmlWizData,
bolIsAdmin=false));
            arrayappend(sttReturn.arrMethods,objCWMolecule.sttCWList(xmlWizData=arguments.xmlWizData,
bolIsAdmin=false));
            arrayappend(sttReturn.arrMethods,objCWMolecule.sttCWDetail(xmlWizData=arguments.xmlWizData,
bolIsAdmin=false));
            sttReturn.strFooter = objCWAtom.strCWCreateComponentFooter(strHint="Studio Wizard
```

-continued

```
Generated Project from class #this.thisclass#");
    </cfscript>
    <!--- SM: END sttCWMGenerate IMPLEMENTATION CODE HERE --->
    <cfreturn sttReturn>
</cffunction>
```

The wizard can use interface layers to interact with external systems, such as a user authentication and licensing system, a Web Site application, or a data repository. By defining the interface layer, rather than a specific implementation, the wizard is able to operate with many different configurations and systems via the addition of simple plug-ins.

The available plug-ins and operating configurations can be controlled by a configuration XML file, which is modified as new plug-ins become available or appropriate for a given the wizard installation.

The wizard can define a Server as a set of zero or more Web Sites that are accessed using the same Interface layer. Physically, a server may be on a single web server or a cluster of web servers. An example of a server is a SiteMaker CMS installation with multiple web sites or a KeyStone server.

The wizard defines a Web Site as an Internet or Intranet site or portal that contains a set of applications or modules. An example of a web site is a single SiteMaker CMS site.

A single wizard installation may be configured to run against multiple Servers, although it usually interacts with only one server at a time. Most wizard functionality occurs once a user is working within a Web Site on a Server.

A user entering the wizard environment directly first selects a Server to work with. Once a Server is selected, the user is presented with a login screen. The login screen uses the credentialing system of the selected Server. After the user is authenticated, a list of available Web Sites from the selected Server is presented and the user selects which one to work with.

Alternately, a user may enter the wizard environment via a link from the external Web Application. In this case, the Server and Web Site are automatically selected, the user is automatically authenticated via pass-through credentials, and the user then begins working immediately within the selected Web Site or even the selected Project within the site.

The user management interface can consist of methods to authenticate a user, maintain their session, and determine their access permissions. It can also track Web Sites and their access permissions. This interface can include the following functionality:

arrGetAdvancedTools( )—Retrieves the advanced tools that apply to this Server.

arrGetSiteIDs( )—Retrieves a list of Web Sites that the current user may access.

bolCanAccessSite( )—Can the current user access the specified site?

bolCanAccessModule( )—Can the current user access the specified module on a site?

bolIsLoggedIn( )—Is there a user currently logged in?

bolIsTimedOut( )—Is the current user invalid because of a session time out?

bolLoginSSOSupported( )—Does the Server support single-sign-on via network authentication?

bolLoginStdSupported( )—Does the Server support sign-on via username and password?

strGetCurrentUserDisplayName( )—Returns the display name of the current user.

strGetServerName( )—Retrieves the name of a given Server.

strGetSiteName( )—Retrieves the name of a given Web Site.

strGetUserSessionURLParams( )—Get parameters, if any, to append to URL to preserve the current user's session.

voidLoginUser( )—Login a user.

voidLogoutUser( )—Log out the current user.

voidRefreshSession( )—Refresh the current user's session.

The project storage depot interface can manage getting lists of current projects, creating or deleting a project, and loading or saving a project. This interface can include the following functionality:

arrGetProjectIDs( )—Retrieves the projects available.

strCreateNewProject( )—Creates a new project.

strGetProjectName( )—Retrieves the name of an existing project.

voidDeleteProject( )—Removes a project from the system.

voidSetProjectData( )—Sets the project definition document for a project.

xmlGetProjectData( )—Retrieves the project definition document for a project.

The module environment interface can manage the wizard created modules within a connected Web Application. It can manage a module's database, source code, and registration. This interface can include the following functionality:

arrCreateOrUpdateTable( )—Creates or updates table definitions within a Web Site.

bolDoesModuleExist( )—Does the specified module exist on the Web Site?

strGetModuleHashCode( )—Returns a unique code that is used to determine if a given module has been altered outside the wizard.

strRunModule( )—Executes a specified module.

sttRegisterModule( )—Registers a new module on a Web Site.

voidSetModuleCode( )—Sets the actual source code for a module.

Wizard Screens can be accessed out of sequence by the user. User can skip wizard screens and allow defaults. Screens can be change based on selections in other screens. StudioWZ can create code for applications that are not applications. There is nothing about the concept that fundamentally limits the applications.

The foregoing description of preferred embodiments of the present invention has been provided for the purposes of illustration and description. It is not intended to be exhaustive or to limit the invention to the precise forms disclosed. Many modifications and variations will be apparent to one of the ordinary skill in the relevant arts. The embodiments were chosen and described in order to best explain the principles of the invention and its partial application, thereby enabling others skilled in the art to understand the invention for various embodiments and with various modifications that are suited to the particular use contemplated. It is intended that the scopes of the invention are defined by the claims and their equivalents.

What is claimed is:

1. A computer-implemented system for enabling a non-technical user of the system to dynamically build a software web application, the software web application being in source code and representing a web application capable of running inside a web portal server and working with the web portal server, comprising:
   a) user interface software for presenting to the non-technical user a template of at least one user interface displayable on a client computer display screen through which the non-technical user may input project information being called for by the template;
   b) a first tier of software codewriters for processing the input project information inputted by the user for defining components to include in the source code software web application;
   c) a second tier of software codewriters each for processing the components for dynamically building, respectively, a method of the source code software web application, said second tier being responsive to the project input information, said first tier of software codewriters being able to call said second tier of software codewriters to combine the respective methods into the software web application;
   d) a third tier of software codewriters which creates the source code of the software web application in accordance with the method built by said second tier, in which each of the third tier software codewriters does not have access to the project information, said second tier of software codewriters being able to call said third tier of software codewriters to create the source code for the web application; and
   e) wherein (i) said user interface software, said first tier, said second tier and said third tier of software codewriters are storable on the web portal server (ii) said user interface software uses said template to construct a plurality of display screens to obtain from the non-technical user parameters for the multiple codewriters, and to provide the parameters to the multiple codewriters to construct the source code for the resulting software web application, (iii) the parameters can be stored as part of a project for dynamically building the source code web application, and (iv) the parameters can be displayed in the series of screens when a project is opened by the non-technical user.

2. The computer-implemented system of claim 1, wherein said codewriters of said third tier create code segments in a first native software language and can be replaced with codewriters that create code segments in a second native software language.

3. The computer-implemented system of claim 1, wherein said template includes screen definitions and references to multiple codewriters.

4. The computer-implemented system of claim 1, wherein said template includes defaults for the source code software web application being built by the non-technical user, at least some of the defaults being displayed to and modifiable by the user in one of the screens.

5. The computer-implemented system of claim 1, wherein the parameters are passed to at least one of said codewriters in an XML data structure.

6. The computer-implemented system of claim 1, wherein said template includes references to form codewriters of said first tier to produce the series of screens.

7. The computer-implemented system of claims 1, wherein the plurality of screens can be accessed in any sequence.

8. The computer-implemented system of claims 1, wherein said user interface software can change the display screens based on user selections from other display screens.

9. The computer-implemented system of claim 1, wherein said template of said user interface software provides screens for inputting information relating to a person's healthcare and said source code software web application is a healthcare application.

* * * * *